(12) United States Patent
Jones et al.

(10) Patent No.: US 9,123,184 B2
(45) Date of Patent: Sep. 1, 2015

(54) SYSTEM AND METHOD FOR DIRECT TRANSFER OF ELECTRONIC PARKING METER DATA

(71) Applicant: Duncan Solutions, Inc., Milwaukee, WI (US)

(72) Inventors: Gavin Jones, Pymble (AU); Steven A. Jones, San Marcos, CA (US); Matthew H. Anastacio, San Diego, CA (US)

(73) Assignee: Duncan Parking Technologies, Inc., Milwaukee, WI (US)

( * ) Notice: Subject to any disclaimer, the term of this patent is extended or adjusted under 35 U.S.C. 154(b) by 0 days.

(21) Appl. No.: 14/137,419

(22) Filed: Dec. 20, 2013

(65) Prior Publication Data

US 2014/0108107 A1    Apr. 17, 2014

Related U.S. Application Data

(63) Continuation of application No. 13/551,181, filed on Jul. 17, 2012, now Pat. No. 8,631,921, which is a continuation of application No. PCT/US2012/037205, filed on May 10, 2012.

(60) Provisional application No. 61/484,568, filed on May 10, 2011.

(51) Int. Cl.
*G07B 15/00* (2011.01)
*G07B 15/02* (2011.01)
*G07F 17/24* (2006.01)

(52) U.S. Cl.
CPC ............. *G07B 15/00* (2013.01); *G07B 15/02* (2013.01); *G07F 17/248* (2013.01)

(58) Field of Classification Search
CPC ............................. G07B 15/00; G07F 17/248
USPC ........ 194/217, 350; 705/13, 418; 235/33, 378
See application file for complete search history.

(56) References Cited

U.S. PATENT DOCUMENTS

| 2,483,805 A | 10/1949 | Broussard et al. |
| 2,495,784 A | 1/1950 | Starts |

(Continued)

FOREIGN PATENT DOCUMENTS

| JP | 08-305998 | 11/1996 |
| JP | 2011-060206 | 3/2011 |

(Continued)

OTHER PUBLICATIONS

International Search Report and Written Opinion for International Application No. PCT/US2012/037229, date of mailing of the international search report Jan. 28, 2013, 14 pages.

(Continued)

*Primary Examiner* — Mark Beauchaine
(74) *Attorney, Agent, or Firm* — Reinhart Boerner Van Deuren s.c.

(57) ABSTRACT

A single space electronic parking meter mechanism for inserting into an outer parking meter housing is provided. The mechanism includes an inner housing, a payment receiving structure supported by the inner housing and an electronic display screen supported by the inner housing. The mechanism also includes a wireless communication subsystem supported by the inner housing configured to wirelessly communicate with a parking management system and an electronic meter control system controlling the electronic display and the wireless communications subsystem. The mechanism includes a memory device receiving port externally accessible through the inner housing and a read-write removable memory device physically accessible from outside of the inner housing and configured to be coupled to the memory device receiving port. The removable memory device including operation mode information that is read by the electronic meter control system to select an operation mode of the meter mechanism.

19 Claims, 17 Drawing Sheets

(56) References Cited

U.S. PATENT DOCUMENTS

| | | | |
|---|---|---|---|
| 2,550,433 A | 4/1951 | Tichenor | |
| 2,594,388 A | 4/1952 | Broussard | |
| 2,596,122 A | 5/1952 | Broussard | |
| 2,596,123 A | 5/1952 | Broussard | |
| 2,596,124 A | 5/1952 | Broussard | |
| 2,613,792 A | 10/1952 | Broussard et al. | |
| 2,613,871 A | 10/1952 | Broussard et al. | |
| 2,618,371 A | 11/1952 | Broussard | |
| 2,633,960 A | 4/1953 | Broussard | |
| 2,822,682 A | 2/1958 | Sollenberger | |
| 2,995,230 A | 8/1961 | Moody et al. | |
| 3,199,321 A | 8/1965 | Sollenberger | |
| 3,204,438 A | 9/1965 | Sollenberger | |
| 3,262,540 A | 7/1966 | Sollenberger et al. | |
| 3,272,299 A | 9/1966 | Sollenberger | |
| 3,438,031 A | 4/1969 | Fathauer | |
| 3,519,113 A | 7/1970 | Arzig et al. | |
| 3,565,283 A | 2/1971 | Sciacero et al. | |
| 4,880,406 A | 11/1989 | Van Horn et al. | |
| 5,060,777 A | 10/1991 | Van Horn et al. | |
| 5,103,957 A * | 4/1992 | Ng et al. | 194/217 |
| 5,109,972 A | 5/1992 | Van Horn et al. | |
| 5,119,916 A | 6/1992 | Carmen et al. | |
| 5,155,614 A | 10/1992 | Carmen et al. | |
| 5,184,707 A | 2/1993 | Van Horn et al. | |
| 5,244,070 A | 9/1993 | Carmen et al. | |
| 5,273,151 A | 12/1993 | Carmen et al. | |
| 5,382,780 A | 1/1995 | Carmen | |
| 5,526,662 A | 6/1996 | Diekhoff et al. | |
| 5,710,743 A | 1/1998 | Dee et al. | |
| 5,805,083 A | 9/1998 | Sutton et al. | |
| 5,806,651 A | 9/1998 | Carmen et al. | |
| 5,841,369 A | 11/1998 | Sutton et al. | |
| 6,037,880 A | 3/2000 | Manion | |
| 6,111,522 A | 8/2000 | Hiltz et al. | |
| D431,788 S | 10/2000 | Tuxen et al. | |
| 6,230,868 B1 | 5/2001 | Tuxen et al. | |
| 6,243,029 B1 | 6/2001 | Tomer | |
| 6,309,098 B1 | 10/2001 | Wong | |
| 6,312,152 B2 | 11/2001 | Dee et al. | |
| 6,354,425 B1 | 3/2002 | Tuxen et al. | |
| D461,728 S | 8/2002 | Tuxen et al. | |
| 6,505,774 B1 | 1/2003 | Fulcher et al. | |
| 6,874,340 B1 | 4/2005 | Berman | |
| 6,889,899 B2 | 5/2005 | Silberberg | |
| 7,019,670 B2 | 3/2006 | Bahar | |
| 7,237,176 B2 | 6/2007 | Briggs et al. | |
| D575,168 S | 8/2008 | King et al. | |
| D587,141 S | 2/2009 | King et al. | |
| 7,617,120 B2 | 11/2009 | Derasmo et al. | |
| 7,806,248 B2 | 10/2010 | Hunter et al. | |
| 7,825,826 B2 | 11/2010 | Welch | |
| 7,854,310 B2 | 12/2010 | King et al. | |
| 7,874,482 B2 | 1/2011 | Mitschele | |
| RE43,245 E | 3/2012 | Ouimet et al. | |
| D659,557 S | 5/2012 | Jones et al. | |
| 8,193,540 B2 | 6/2012 | Huang et al. | |
| D684,870 S | 6/2013 | Jones et al. | |
| 8,590,687 B2 | 11/2013 | King et al. | |
| 8,749,403 B2 | 6/2014 | King et al. | |
| 2002/0074344 A1 | 6/2002 | Long et al. | |
| 2003/0112151 A1* | 6/2003 | Chauvin et al. | 340/870.02 |
| 2003/0128136 A1 | 7/2003 | Spier et al. | |
| 2003/0132840 A1 | 7/2003 | Bahar | |
| 2003/0144905 A1 | 7/2003 | Smith | |
| 2004/0160905 A1 | 8/2004 | Bernier et al. | |
| 2005/0168352 A1 | 8/2005 | Tomer | |
| 2006/0067123 A1* | 3/2006 | Jigour et al. | 365/185.05 |
| 2006/0173733 A1 | 8/2006 | Fancher | |
| 2006/0255119 A1 | 11/2006 | Marchasin et al. | |
| 2007/0210935 A1 | 9/2007 | Yost et al. | |
| 2008/0158010 A1 | 7/2008 | Nath et al. | |
| 2008/0245638 A1 | 10/2008 | King et al. | |
| 2009/0026842 A1 | 1/2009 | Hunter et al. | |
| 2009/0095593 A1 | 4/2009 | King et al. | |
| 2009/0099761 A1 | 4/2009 | Davis et al. | |
| 2009/0159674 A1 | 6/2009 | King et al. | |
| 2009/0183966 A1 | 7/2009 | King et al. | |
| 2009/0192950 A1 | 7/2009 | King et al. | |
| 2009/0267732 A1 | 10/2009 | Chauvin et al. | |
| 2009/0287578 A1 | 11/2009 | Paluszek et al. | |
| 2010/0153193 A1 | 6/2010 | Ashby et al. | |
| 2011/0022427 A1 | 1/2011 | Dayan | |
| 2011/0057815 A1 | 3/2011 | King et al. | |
| 2011/0060653 A1* | 3/2011 | King et al. | 705/14.58 |
| 2012/0285790 A1 | 11/2012 | Jones et al. | |
| 2012/0285791 A1 | 11/2012 | Jones et al. | |
| 2012/0285792 A1 | 11/2012 | Jones et al. | |
| 2012/0285793 A1 | 11/2012 | Jones et al. | |
| 2012/0286036 A1 | 11/2012 | Jones et al. | |
| 2012/0286968 A1 | 11/2012 | Jones et al. | |

FOREIGN PATENT DOCUMENTS

| | | |
|---|---|---|
| KR | 10-2000-0016671 | 3/2000 |
| KR | 10-2001-0028481 | 4/2001 |
| KR | 10-2008-0041730 | 5/2008 |
| WO | WO 00-59201 | 10/2000 |
| WO | WO 02-063570 | 8/2002 |
| WO | WO 2012/154902 | 11/2012 |
| WO | WO 2012/154913 | 11/2012 |

OTHER PUBLICATIONS

International Search Report and Written Opinion for International Application No. PCT/US2012/037205, date of mailing of the international search report Oct. 4, 2012, 10 pages.

Duncan Solutions, Eagle CK Single-Space Meter Mechanism Brochure, believed to be commercially available before May 10, 2010, 2 pages.

Duncan Solutions, Eagle 2100 Single-Space Meter Mechanism Brochure, believed to be commercially available before May 10, 2010, 2 pages.

Duncan Solutions, Parking and Enforcement From Start to Finish, Intermec CN50, available at http://www.duncansolutions.com/IntermecCN50.html, believed to be commercially available before May 10, 2010, 2 pages.

Duncan Solutions, Parking and Enforcement From Start to Finish, Motorola MC75, available at http://www.duncansolutions.com/MotorolaMC75.html, believed to be commercially available before May 10, 2010, 1 page.

Duncan Solutions, VM/VS Pay-by-Space Multi-Space Meter Brochure, available at http://www.duncansolutions.com/pdfs/VM.pdf, believed to be commercially available before May 10, 2010, 2 pages.

Duncan Solutions, AutoCITE X3 Handheld Computer Brochure, available at http://www.duncansolutions.com/pdfs/X3.pdf, believed to be commercially available before May 10, 2010, 2 pages.

AutoISSUE, Automated Citation Issuance System Brochure, believed to be commercially available before May 10, 2010, 2 pages.

Duncan Solutions, AutoTRAX Meter Management System Brochure, believed to be commercially available before May 10, 2010, 2 pages.

* cited by examiner

SYSTEM AND METHOD FOR DIRECT TRANSFER OF ELECTRONIC PARKING METER DATA

CROSS-REFERENCE TO RELATED PATENT APPLICATIONS

This application is a continuation of U.S. application Ser. No. 13/551,181, filed Jul. 12, 2012, which is a continuation of International Application No. PCT/US2012/037205, filed May 10, 2012, which claims the benefit of U.S. Provisional Patent Application No. 61/484,568 filed May 10, 2011, which are incorporated herein by reference in their entireties.

BACKGROUND OF THE INVENTION

The present invention relates generally to the field of parking meter systems, devices and methods. The present invention relates specifically to a parking meter system equipped for replacement of meter mechanism of parking meters within the system.

Single space parking meters are typically associated with a single parking space. To utilize an individually metered parking space, a motorist typically inserts money into the parking meter, and the parking meter displays an amount of time related to the amount of money inserted. A multi-space meter typically provides a single payment location for more than one parking spot, and the multi-space meter receives payment and tracks meter time for the multiple parking spots. For either type of meter, the motorist may park at the metered spot for the amount of parking time purchased. When the time on the meter expires, the motorist may move their car or add more time to the meter. If the meter expires and the motorist remains parked at the meter, a parking enforcement officer may issue a parking ticket. A city or other entity may operate a city wide system of single space parking meters and/or multi-space meters.

SUMMARY OF THE INVENTION

Generally, one embodiment of the invention relates to a single space parking meter mechanism with a removable memory device port. The meter mechanism is configured to select an operating mode based upon mode operation information read from a removable memory device received in the port. Another embodiment of the invention relates to a method of directly transferring data from a pre-existing single space meter mechanism to a new single space meter mechanism during replacement of the pre-existing single space meter mechanism.

Another embodiment of the invention relates to a single space electronic parking meter mechanism for inserting into an outer parking meter housing. The single space electronic parking meter mechanism includes an inner housing, a payment receiving structure supported by the inner housing, an electronic display screen supported by the inner housing, a wireless communication subsystem supported by the inner housing configured to wirelessly communicate with a parking management system, an electronic meter control system controlling the electronic display and the wireless communications subsystem, a memory device receiving port externally accessible through the inner housing and a read-write removable memory device physically accessible from outside of the inner housing and configured to be coupled to the memory device receiving port. The removable memory device including operation mode information that is read by the electronic meter control system to select an operation mode of the meter mechanism.

Another embodiment of the invention relates to a single space parking meter kit including a first single space meter mechanism and a second single space meter mechanism. The first single space meter mechanism includes an inner housing, an electronic display screen supported by the inner housing of the first single space meter mechanism, a wireless communication subsystem supported by the inner housing of the first single space meter mechanism configured to wirelessly communicate with a parking management system, an electronic meter control system controlling the electronic display and the wireless communications subsystem of the first single space meter mechanism and a removable read-write memory device accessible from outside of the inner housing of the first single space meter mechanism. The removable memory device including location identification information representative of the physical, geographic location of the first single space meter mechanism within a parking system. The second single space meter mechanism includes an inner housing, an electronic display screen supported by the inner housing of the second single space meter mechanism, a wireless communication subsystem supported by the inner housing of the second single space meter mechanism configured to wirelessly communicate with the parking management system, an electronic meter control system controlling the electronic display and the wireless communications subsystem of the second single space meter mechanism, a meter identification number, and a port configured to receive the removable read-write memory device. The control system of the second single space meter mechanism is configured to access the location identification information from the removable read-write memory device and to communicate both the location identification information and the meter identification number of the second single space meter to the parking management system.

Another embodiment of the invention relates to a computerized parking management system for processing, storing and communicating data within a wirelessly communicating parking system, and the parking system includes a plurality of single-space parking meters each equipped with an electronic meter mechanism. The parking management system includes a control computer and a parking system database controlled by the control computer. The database includes a unique meter ID representative of each electronic meter mechanism within the parking system and a unique location ID representative of the physical, geographic location of each single-space parking meter within the parking system. The parking management system includes wireless communications hardware controlled by the control computer to transmit data wirelessly to the plurality of single space parking meters within the parking system. Following replacement of a pre-existing electronic meter mechanism with a new electronic meter mechanism at one of the single space parking meters, the control computer is configured to receive a new meter ID communicated wirelessly from the new meter mechanism that identifies the new electronic meter mechanism. The control computer is configured to associate the new meter ID with the location ID for the single space meter that has received the new electronic meter mechanism within the parking system database.

Another embodiment of the invention relates to a method of replacing a pre-existing electronic meter mechanism with a new electronic meter mechanism. The method includes opening an outer meter housing that surrounds the pre-existing electronic meter mechanism. The method includes directly transferring location ID information representative of the physical, geographic location of the outer meter housing from the pre-existing electronic meter mechanism to a memory device physically associated with the new electronic meter mechanism. The method includes transmitting the location ID information wirelessly from the new meter mechanism to a parking management system.

Another embodiment of the invention relates to a method of replacing a pre-existing electronic meter mechanism with a new electronic meter mechanism. The method includes delivering a new meter mechanism to a recipient. The new meter mechanism including an inner housing, an electronic display screen supported by the inner housing, a wireless communication subsystem supported by the inner housing configured to wirelessly communicate with a parking management system, an electronic meter control system controlling the electronic display and the wireless communications subsystem and a port configured to receive data directly from the pre-existing meter mechanism. The method includes the recipient of the new meter mechanism opening an outer meter housing that surrounds the pre-existing electronic meter mechanism and directly transferring location ID information representative of the physical, geographic location of the outer meter housing from the pre-existing electronic meter mechanism to the new electronic meter mechanism. The new meter mechanism is configured to transmit the location ID information wirelessly directly from the new meter mechanism to the parking management system.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, various embodiments of a wirelessly communicating single space parking meter, a parking system utilizing such parking meters and related methods are disclosed herein. Generally, the single space meters discussed herein include an electronic meter mechanism that includes various electronic devices (e.g., wireless communication equipment, multifunctional electronic display, various payment devices, vehicle sensor, power supply, and/or control electronics, etc.). Typically, the electronic meter mechanism is located within an outer housing when in use.

Under certain conditions (e.g., upgrade, replacement, etc.), a new electronic meter mechanism may be swapped out for the current meter mechanism located within the outer meter housing. The various embodiments of the electronic single space meter mechanism discussed herein include a removable read-write memory device that stores meter and location specific information. To replace the current meter with the new meter, the removable memory device is removed from the current meter and plugged into the new meter. The new meter reads the information from the removable memory device, and utilizes the information to associate the new meter with the particular physical location within the parking system. In various embodiments, the removable memory device may include all of the information needed to assign the new meter to the location and to allow the meter to operate properly in the new location. Further, in some embodiments, different versions of a read-write removable memory device may be used to provide additional functionality discussed herein.

Figure 1:
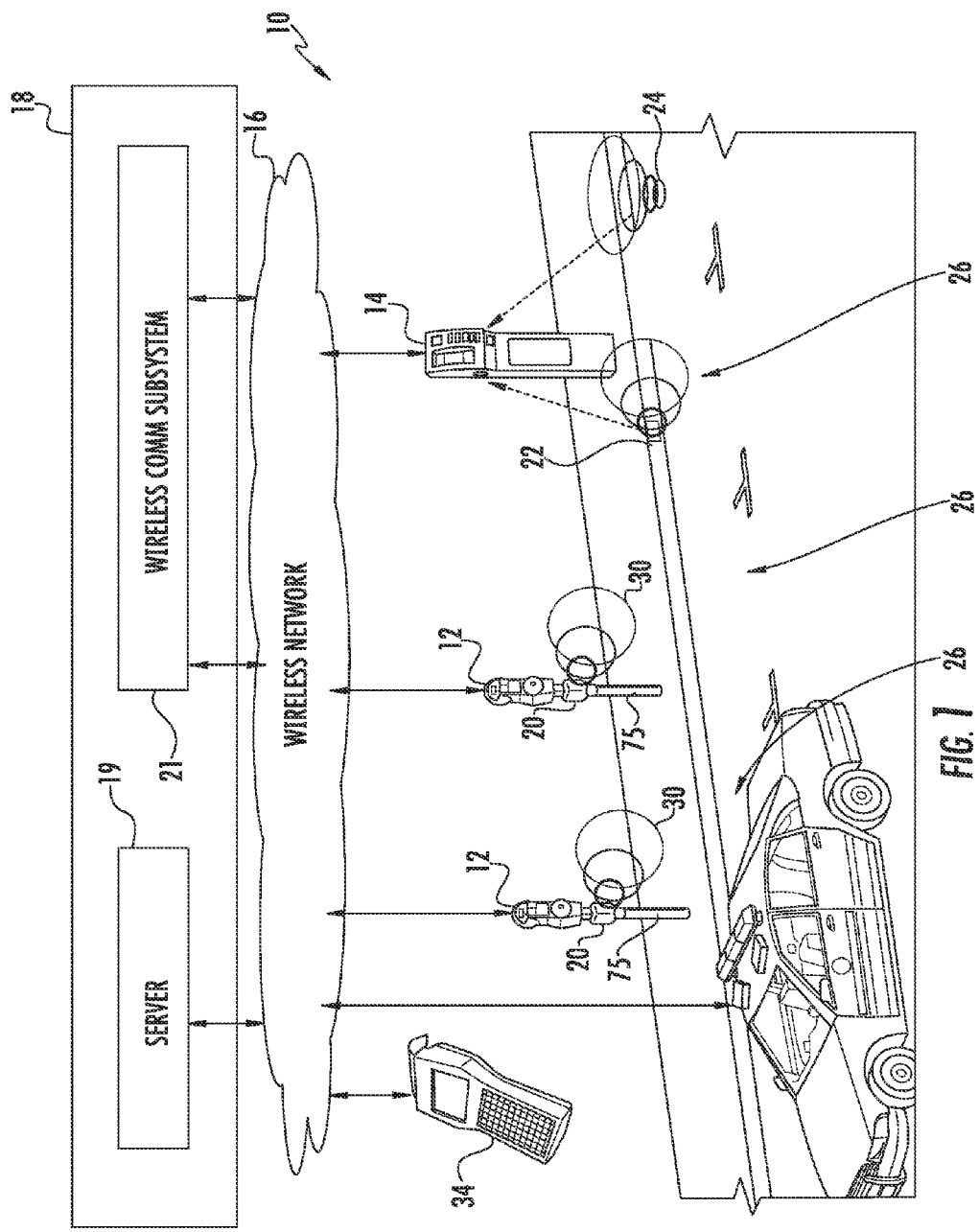
FIG. 1 shows a parking system according to an exemplary embodiment.
Figure 2:
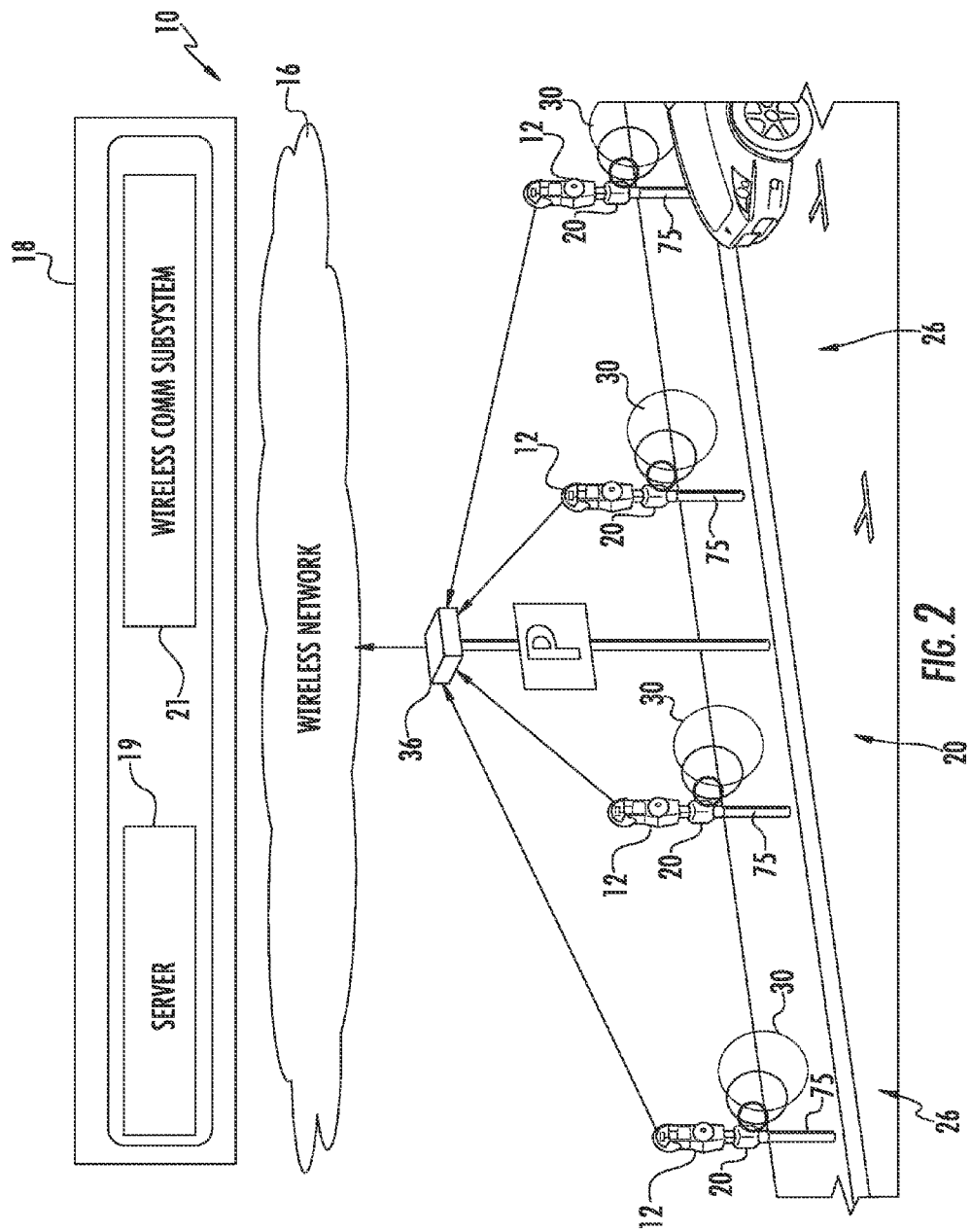
FIG. 2 shows a parking system according to another exemplary embodiment.
Figure 3:
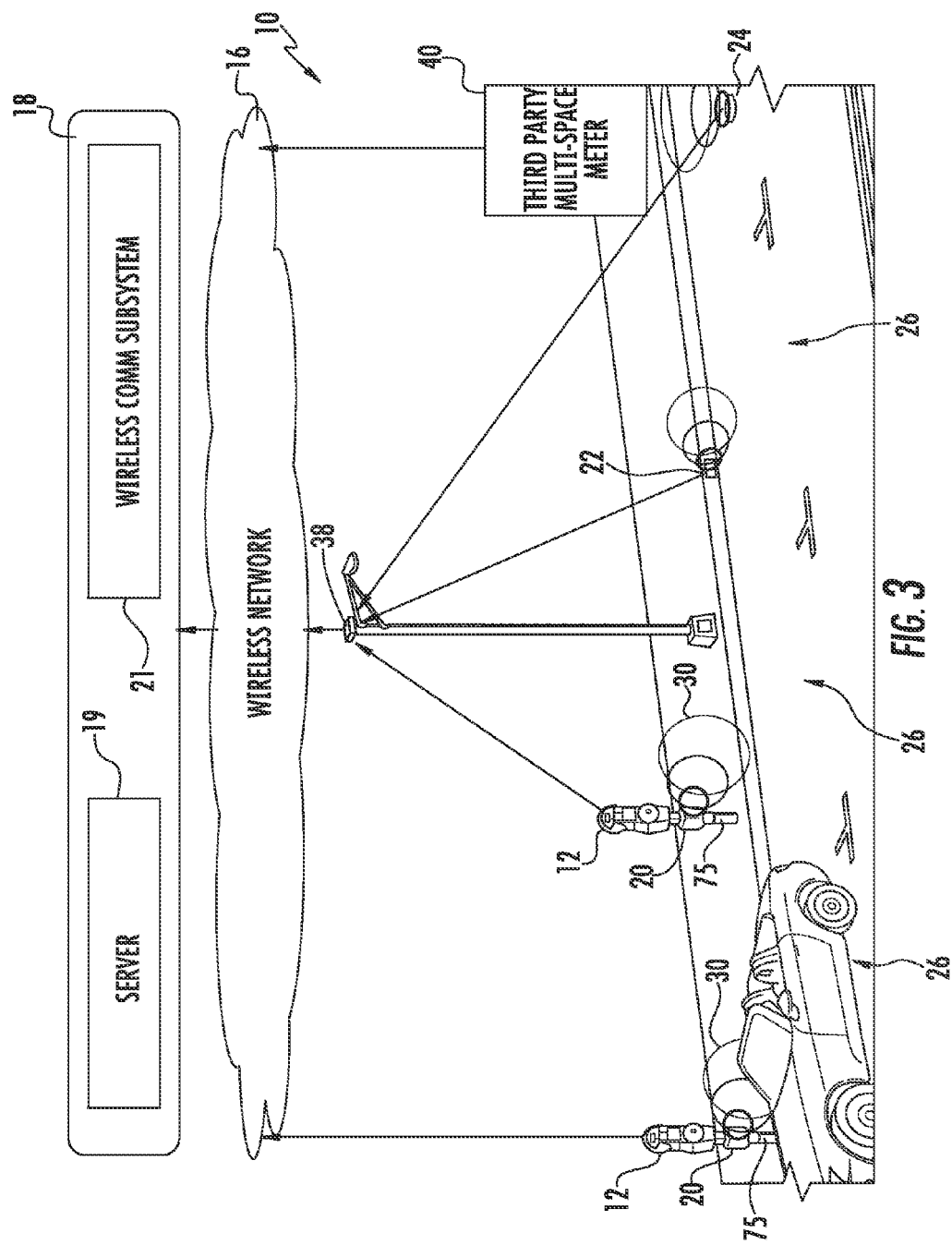
FIG. 3 shows a parking system according to another exemplary embodiment.

Referring to FIGS. 1, 2 and 3, various exemplary embodiments of parking system 10 are shown. In the exemplary embodiment of FIG. 1, parking system 10 includes one or more single-space parking meters 12, one or more multi-space parking meters 14, a communication network, shown as wireless network 16, and a parking system control system, shown as parking management system 18. Both single-space meters 12 and multi-space meter 14 may be configured to communicate with parking management system 18 by directly accessing wireless network 16. In various embodiments, wireless network 16 may be a mobile telephone system, and meters 12 and 14 may access wireless network 16 utilizing standard mobile telephone systems (e.g., GSM, GPRS, EDGE, etc.).

As discussed in more detail below, meters 12 and 14 are configured to communicate parking meter data to parking management system 18 via wireless network 16. Parking management system 18 is a computerized, server system that includes a parking database that provides for processing, storage and management of data within parking system 10. In one embodiment shown in FIG. 1, parking management system 18 includes at least one server 19 and wireless communications subsystem 21. Server 19 is configured to store and process parking data associated with a particular parking spot (e.g., current parking space occupancy information, current meter time, vehicle sensor data, information regarding mode of payment, vehicle arrival information, vehicle departure information, parking rates, location information, etc.), including parking data received wirelessly from the meters, to generally provide the parking system functions discussed herein. Wireless communications hardware 21 of parking management system 18 is configured to allow server 19 to communicate wirelessly with the various components of parking system 10 discussed herein.

Server 19 is configured to store and generate data that may be communicated wirelessly to the various components of parking system 10, and in this embodiment, wireless communication hardware 21 is configured to transmit system data or information from server 19 to the appropriate component of the parking system. For example, wireless communication hardware 21 is configured to transmit and meters 12 and 14 are configured to receive information from parking management system 18 via wireless network 16. The system data transmitted from parking management system 18 and received by the parking meters 12 and 14 may include parking meter configuration data, parking rate data, time and date data, testing and diagnostic data, parking meter software updates, etc. It should be understood that while the embodiments discussed herein relate primarily to a parking system that communicates with parking management system 18 via a wireless communication network 16, in other embodiments, a wired or a combination wired/wireless communication network may be used to provide communication to parking management system 18.

Server 19 is also configured to manage and track information related to the particular devices associated with parking system 10. In one embodiment, server 19 includes one or more control computes and a parking system database. The database maintained by server 19 tracks the serial number or other unique identifier of each electronic meter mechanism associated with each single space meter 12 within parking system 10. In this embodiment, the database associates electronic meter mechanism serial number (or other meter identification data) with a unique location identifier (e.g., location ID 130 discussed below) that identifies the physical, geographic location of the single space meter that is equipped with the electronic meter mechanism. The database stored on server 19 also stores other information tied to a particular single space meter. For example, the database stores rate information, configuration data, software and firmware version information associated with the unique location identifier that identifies the physical, geographic location of the single space meter that is equipped with the electronic meter mechanism. This data may be provided wirelessly to the electronic meter mechanism as needed to ensure the electronic meter mechanism is up to date. In addition, after a new electronic meter mechanism is installed into a single space meter as discussed below, the new meter mechanism may synchronize itself with the database to ensure the data the new meter mechanism has for the particular location ID is correct and up to date. In one such embodiment, following replacement of a pre-existing electronic meter mechanism with a new electronic meter mechanism at one of the single space parking meters, server 19 is configured to receive the serial number (or other unique meter identifier) communicated wirelessly from the new meter mechanism that identifies the new meter mechanism. When the new meter identification info is received, the control computer is configured to modify the parking system database to associate the new meter identification info with the location ID for the single space meter that received the new meter mechanism.

Parking system 10 also includes one or more vehicle sensors, shown as pole-mount vehicle sensors 20, curb surface-mount sensor 22 and street surface-mount sensor 24. Generally, sensors 20, 22 and 24 are each associated with a single parking space 26 and are configured to detect the presence of a vehicle located in the associated parking space, to detect entry of a vehicle into the associated parking space and/or to detect the exit of a vehicle from the associated parking space. In the embodiment of FIG. 1, a pole-mount sensor 20 is associated with and in communication with each single-space meter 12, and sensors 22 and 24 are associated with and in communication with multi-space meter 14. In other embodiments, a subterranean sensor may be located beneath the surface of the parking spot in place of street surface-mount sensor 24. In other embodiments, a curb surface-mount sensor 22, a street surface-mount sensor 24 or subterranean sensor, may be associated with a single-space meter 12 instead of pole-mount sensor 20. Generally, vehicle sensors 20, 22 and 24 are directional sensors (i.e., sensor that only senses in a particular region or direction) and include a targetable detection zone. Generally, the vehicle sensors are positioned such that the targetable detection zone is located within the parking space associated with the meter and is not located in adjacent parking spaces.

Vehicle sensors 20, 22 and 24 are configured to detect one or more aspect (e.g., presence, entry, exit, etc.) of a vehicle within the parking spot associated with the sensor and to generate a signal indicative of the detected aspect of the vehicle. The generated signal is then communicated from the sensor to a controller associated with the parking meter for the parking spot. In various embodiments, communication from the sensors to the associated meter may be either through wired or wireless communication. The parking meter may execute various functions (e.g., update time on the meter, restrict further parking in the space, determine the meter is expired, etc.) in response to the detected aspect of the vehicle and may send data to and/or receive data from parking management system 18 in response to the detected aspect of the vehicle. In addition, data generated by the vehicle sensor associated with each meter (e.g., data related to the presence of a vehicle within the space associated with the meter) may be communicated to parking management system 18 via the wireless communications hardware of the meter.

Referring to FIGS. 1, 2 and 3, parking system 10 includes a plurality of single-space meters 12 (e.g., 2, 3, 4, . . . 50, . . . 100, more than 2, more than 10, more than 20, more than 50, more than 100, etc., single-space meters), and may include one or more multi-space parking meters 14. In such embodiments, the database maintained by server 19 includes a unique location identifier associated with each of the meters within parking system 10.

In the embodiments shown, each single-space parking meter 12 includes a pole mounted vehicle sensor 20 physically coupled to and supported by the parking meter pole 75. As shown, pole 75 includes a lower end coupled to the ground adjacent to and set back from parking space 26 associated with the meter 12 such that there is a distance or space located between pole 75 and space 26. With vehicle sensor 20 coupled to pole 75, a space is present between vehicle sensor 20 and parking space 26, and vehicle sensor 20 is configured to detect an aspect of a vehicle located within parking space 26 across the space. As shown in FIG. 1, vehicle sensor 20 includes a targetable detection zone 30, and vehicle sensor 20 is positioned on pole 75 such that the detection zone 30 of vehicle sensor 20 is located within parking space 26. In another embodiment, vehicle sensor 20 may be physically coupled to and supported by the parking meter housing. In these embodiments, vehicle sensor 20 is located above both the street and sidewalk surface and is also set back from the curb.

Referring to FIGS. 1 and 3, in various embodiments, parking system 10 may also include curb mount vehicle sensors 22 and/or street mount vehicle sensors 24 that communicate parking space usage information wirelessly to a multi-space meter 14 or directly to parking management system 18. In contrast to pole-mount sensors 20, curb mount vehicle sensors 22 and/or street mount vehicle sensors 24 include their own power supply and communications hardware. In the embodiment shown in FIG. 1, curb mount vehicle sensors 22 and/or street mount vehicle sensors 24 are stand-alone sensors configured for relatively short range wireless communication to a multi-space meter 14, and multi-space meter 14 is configured for cellular communication with parking management system 18.

Generally, the vehicle sensors include a sensing element (e.g., an electromagnetic energy transmitter and receiver, transceiver, etc.) located within sensors housing. Sensors 20, 22 and 24 may be sensors configured to utilize electromagnetic energy to detect the presence of the vehicle in the parking space, and specifically, sensors 20, 22 and 24 may be a radiofrequency (RF) sensor including a radiofrequency-based sensing element. In other embodiments, sensors 20, 22 and 24 may be any sensors suitable for detecting an aspect of a vehicle in the associated parking space. For example, sensors 20, 22 and 24 may be infrared reflectance sensors, ultrasonic sensors, capacitance sensors, proximity sensors, magnetic sensors, magnetic-flux sensors, non-intrusive sensors, radar-based sensors, a low power/broad spectrum radar sensor, time of flight sensors, ranging sensors, etc.

In addition to generating signals indicative of vehicle presence, vehicle entry to the parking spot and vehicle exit from a parking spot, vehicle sensors 20, 22 and 24 may be configured to generate other signals related to the parking spot or vehicles located in the parking spot that may be used by parking system 10. For example, the vehicle sensors may be configured to generate a signal indicative of a vacant parking spot. In another embodiment, the vehicle sensors may be configured to generate a signal indicative of the type of vehicle located in the parking spot. For example, the vehicle sensor may be configured to generate a signal indicative of a motorcycle, a signal indicative of a car, a signal indicative of a truck, etc., being present in parking space 26. As another example, the vehicle sensor may be configured to generate a signal indicative of a privately owned vehicle located in parking space 26 and a different signal indicative of a publicly-owned or government vehicle located in parking space 26. In other embodiments, a vehicle sensor may include a digital camera configured to capture image data of a vehicle located in the parking spot. In one embodiment, the electronic meter mechanism associated with each single space meter may store this vehicle sensor information which may be transferred to a new meter (e.g., using removable memory device 64, discussed below) or may be extracted for use elsewhere (e.g., using data extraction memory device 300 discussed below).

Referring back to FIG. 1, parking system 10 may include one or more mobile citation units, shown as handheld unit 34. Handheld unit 34 communicates with parking management system 18 via wireless network 16. In the embodiment shown in FIG. 1, handheld unit 34 includes wireless communications hardware for communication with parking management system 18 via wireless network 16. Handheld unit 34 is carried by parking enforcement personnel and is used to issue citations for parking violations. Handheld unit 34 sends various types of enforcement data (e.g., data indicating issuance of a citation, data related to the type of citation issued, location of parking violation, vehicle identification information, etc.) to parking management system 18 via wireless network 16. Handheld unit 34 also receives various information from parking management system 18. In one embodiment, handheld unit 34 receives information to facilitate the issuances of citations. For example, handheld unit 34 may receive data indicative of the existence and location of expired meters. In one embodiment, handheld unit 34 may receive data regarding which meters within a certain distance from unit 34 are expired. It should be understood that while the figures show a handheld citation unit, other mobile citation units may be used within parking system 10. For example, a mobile citation unit may be mounted within a vehicle driven by enforcement personnel.

Referring to FIG. 2, parking system 10 is shown according to another exemplary embodiment. In this embodiment, parking system 10 includes a plurality of single-space meters 12 each having a pole-mounted vehicle sensor 20, a wireless network 16 and a parking management system 18. This embodiment of parking system 10 includes a gateway 36, and single-space meters 12 are configured for short-range communication with gateway 36. In this embodiment, gateway 36 provides the communication link between multiple meters 12 and parking management system 18 via wireless network 16. In one such embodiment, single-space meters 12 are configured for short-range RF communication with gateway 36, and gateway 36 is configured for communication (e.g., cellular, WIFI, etc.) with parking management system 18 via wireless network 16. Communication between meters 12 and gateway 36 may be via any suitable RF communication technology, standard, or protocol (e.g., WIFI, IEEE 802.15.4, Bluetooth, ZigBee, etc.). Parking system 10 may also include one or more multi-space parking meter 14 in place of, or in addition to, single-space meters 12. In such an embodiment, the multi-space meter may also communicate with gateway 36 using a wireless, RF technology.

Referring to FIG. 3, another embodiment of parking system 10 is shown including a gateway 38 and a multi-space meter 40. In this embodiment, parking system 10 includes one or more stand-alone vehicle sensors, such as curb surface-mount sensor 22 and street surface-mount sensor 24, configured to monitor occupancy of the parking spaces associated with multi-space meter 40. In this embodiment, gateway 38 receives wireless communication from both single-space meters 12 and the stand-alone vehicle sensors (i.e., sensor 22 and sensor 24). Similar to the embodiment shown in FIG. 5, gateway 38 communicates information received from meters 12 and sensors 22 and 24 to parking management system 18 via wireless network 16. Multi-space meter 40 communicates directly with parking management system 18 via wireless network 16. In this embodiment, parking management system 18 is configured to properly associate the data received from the stand-alone vehicle sensors with the data for the appropriate parking space received from multi-space meter 40.

Also as shown in FIG. 3, parking system 10 may be configured to provide compatibility between parking meters made by different companies. For example, in one embodiment, parking meters 12 may be produced by a first company or manufacturer and multi-space meter 40 may be made by a second company or manufacturer. In this embodiment, sensors 20, 22 and 24 may be compatible with meters made by different companies. Further, parking management system 18 is configured to receive, store and process data received from parking meters or vehicle sensors made by different companies. This allows current, installed single-space and multi-space meters manufactured by different companies to be upgraded to provide the wireless communications and vehicle sensing functionalities discussed herein.

Figure 4:
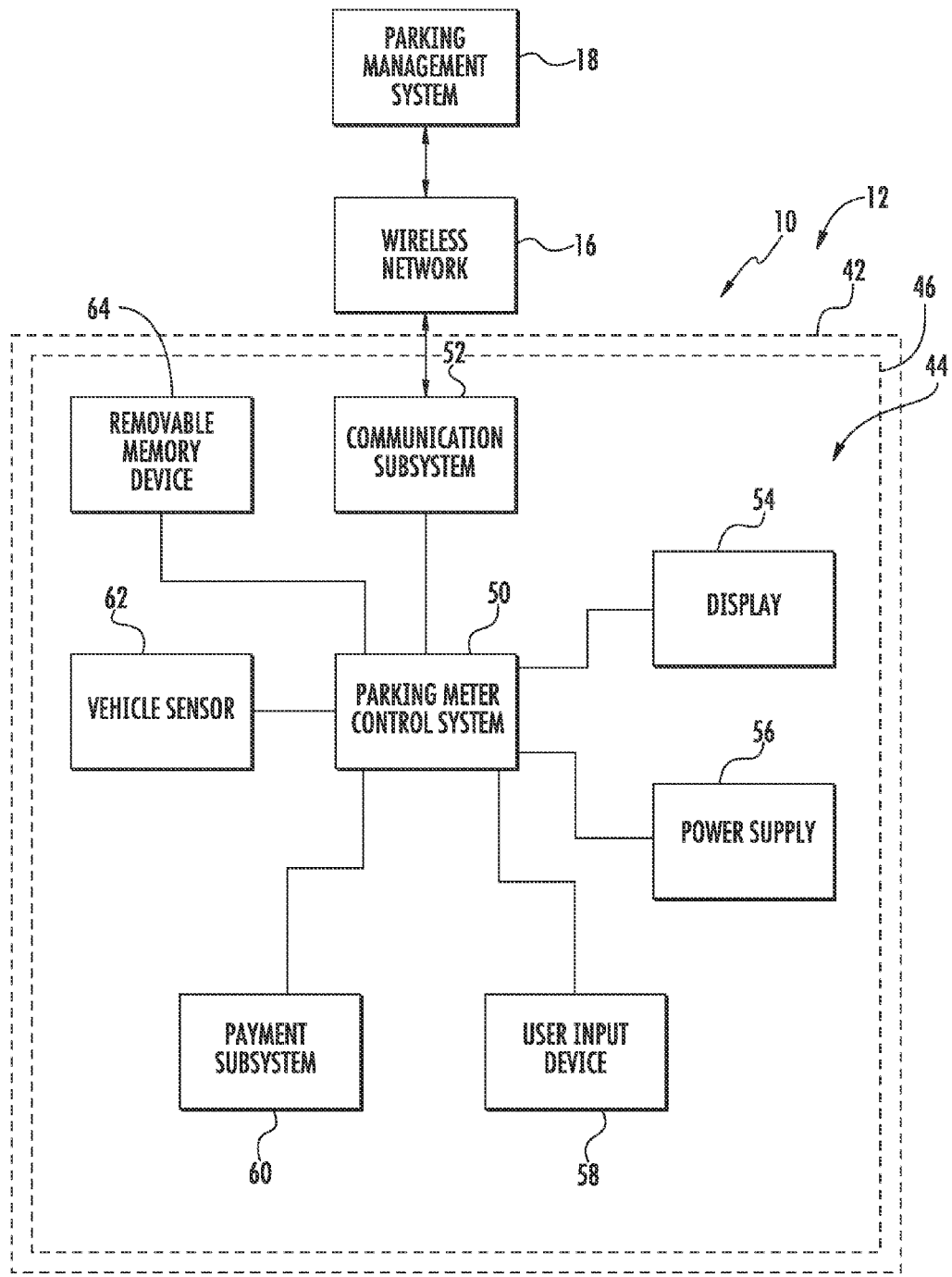
FIG. 4 is a block diagram of a parking system according to an exemplary embodiment.

Referring to FIG. 4, a block diagram of parking system 10 is shown according to an exemplary embodiment, and includes a single-space electronic parking meter 12. It should be understood that parking system 10 may include a plurality of single-space parking meters 12 and one or more multi-space meters 14 as discussed above. As shown in FIG. 4, single space meter 12 includes an outer housing 42 and an electronic meter mechanism 44 located within outer housing 42. Electronic meter mechanism 44 includes an inner housing 46 that supports the electronics of electronic meter mechanism 44.

Figure 19:
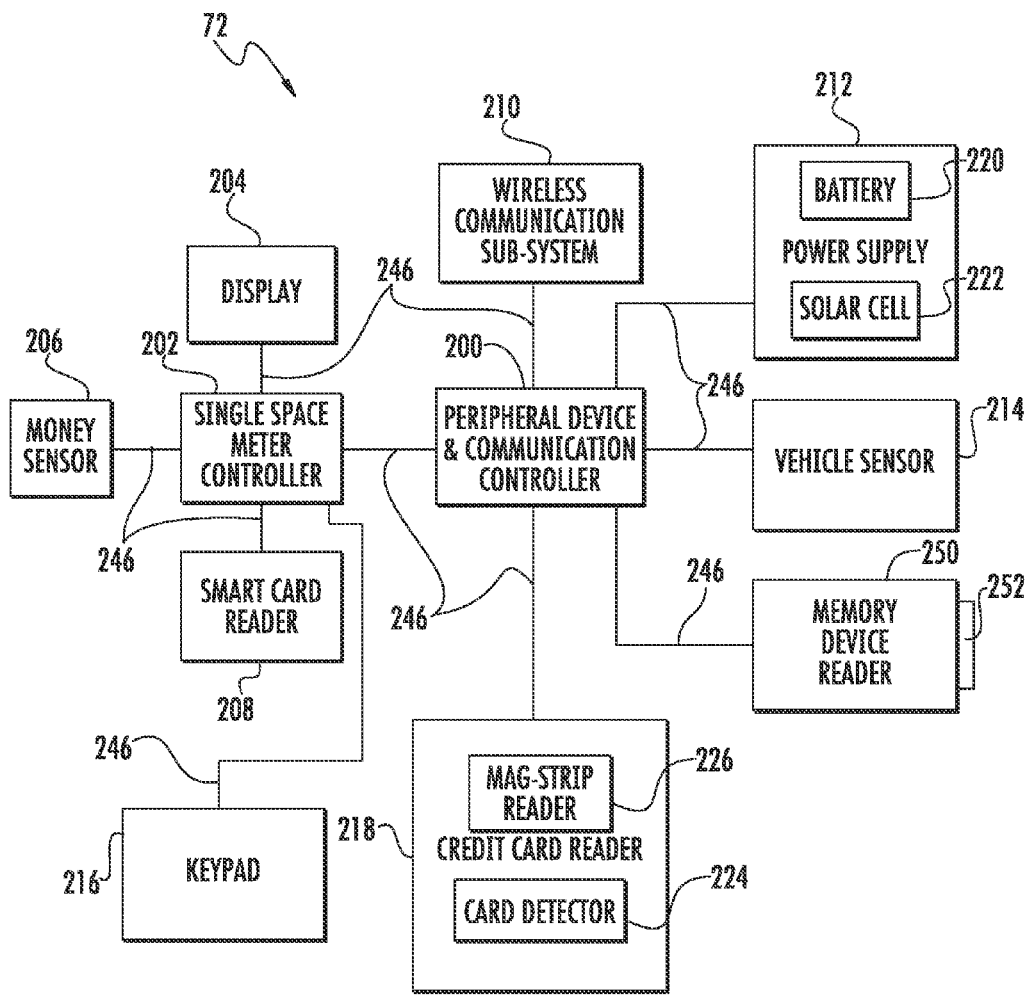
FIG. 19 is a block diagram showing an electronic meter mechanism according to an exemplary embodiment.

FIG. 4 also shows a block diagram of the components and device of electronic meter mechanism 44. Meter mechanism 44 includes a parking meter control system 50, a communication subsystem 52, a display 54, a power supply 56, a user input device 58, a payment subsystem 60, a vehicle sensor 62 and a removable memory device 64. Parking meter control system 50 is communicably coupled to communication subsystem 52, display 54, power supply 56, user input device 58, payment subsystem 60, vehicle sensor 62 and removable memory device 64. Parking meter control system 50 may generally be any electronic control unit suitable to provide the various parking meter functionalities discussed below. For example control system 50 may include one or more processing circuits having hardware (e.g., processors, memory, communication interfaces, etc.) and/or software configured to control the operation of parking meter 12 as discussed herein. In one embodiment, control system 50 includes two processors that each control various device of meter mechanism 44, as shown in FIG. 19.

Communication subsystem 52 includes hardware and/or software for communicating data between parking meter control system 50 and parking management system 18 via wireless network 16. As shown in FIG. 1 communication subsystem 52 may be a communication subsystem associated with a single-space parking meter 12 that is configured to communicate data between the associated meter and parking management system 18 via wireless network 16 utilizing standard mobile telephone communication systems (e.g., GSM, GPRS, EDGE, etc.). As shown, in FIGS. 2 and 3, communication subsystem 52 may include RF communication hardware and software physically coupled to single-space parking meter 12 and/or associated with a stand-alone vehicle sensor and a gateway, such as gateway 36 and 38. In this embodiment, data is communicated from single-space meter 12 or from the stand-alone vehicle sensor to the gateway and the gateway communicates the information to parking management system 18.

Single-space meter 12 also includes a display 54 that displays various parking related information (e.g., parking rate, current time and date, time remaining on meter, a meter expired message, user operation instructions, hours of meter operation, meter status information, user information during replacement, maintenance and data extraction processes, etc.) to the user of single-space meter 12. Display 54 may be a graphical high contrast, low power display. The display may be color or monochrome. Display 54 may be an LED display or LCD display. In other embodiments, display 54 includes both a front facing screen on the sidewalk facing side of the meter and a rear facing screen on the street facing side of the meter.

Single-space meter 12 also includes a power supply 56 suitable to power the functions of single-space meter 12 discussed herein. In one embodiment, power supply 56 may include one or more solar cells or solar panels and one or more self-sustained energy storage devices (e.g., rechargeable batteries, ultracapacitors, etc.). In other embodiments, power supply 56 may be wired AC power supply. In one embodiment, single-space meter 12 may be configured to communicate power supply data wirelessly to parking management system 18 via the meter's wireless communication hardware. Power supply data may include data related to a battery and/or solar cell of the meter (e.g., battery charge rate, remaining battery charge, remaining battery life, real-time current supplied by solar cell, average current supplied by solar cell, resistance at various sections within the power supply, error messages indicating battery failure, error messages indicating solar panel failure, real-time power consumption, average power consumption, etc.).

Single-space meter 12 also includes a user input device 58 that allows the user to interact with and operate the meter. In one embodiment, user input device 58 is a four button keypad that provides tactile feedback and/or audible feedback to the user. Single-space meter 12 also includes a payment subsystem 60 configured to receive and process payment for parking. In one embodiment, payment subsystem 60 includes currency reader (e.g., a money or coin slot and a money detector, a bill slot and bill detector, etc.), a credit-card, mag-strip reader, a smart card reader, and/or a "pay by phone" system. Further, single-space meter 12 also includes a vehicle sensor 62 (e.g., pole-mount vehicle sensors 20, curb surface-mount sensor 22 and street surface-mount sensor 24 as shown in FIGS. 1, 2 and 3) that communicates information to control system 50 regarding an aspect of a vehicle in the parking space associated with meter 12.

Single space meter 12 includes a removable, read-write memory device 64. Generally, removable memory device 64 stores information and/or software that can be utilized by single space meter 12 to allow single space meter 12 to operate properly based on the physical location of meter 12 within parking system 10 and based upon the particular parking system 10 (e.g., meter configurations specialized for a particular city such display of city name). Generally removable memory device 64 stores the information and/or software in a computer or electronics readable form. As explained in more detail below, memory device 64 may be removed from a first, current or pre-existing meter mechanism 44 located within a particular meter housing and inserted into a socket or port on a new meter mechanism 44 that is to replace the current meter mechanism. The new meter mechanism 44 reads the data from memory device 64 and utilizes the data to program the new meter mechanism 44 to function properly based on the physical location of meter 12 within parking system 10 and based upon the particular parking system 10. In various embodiments, in addition to storing information in a computer or electronics readable form, the information stored by removable memory device 64 may include human readable indicia (e.g., a written label, a logo, a color code, text, numbers, graphics, etc.) representative of information such as the location of an individual meter 12, an identification number for the outer housing of an individual meter 12, an identifying number for a particular memory device 64, etc. The human readable indicia may facilitate insertion of memory device 64 into the proper meter mechanism or placement of the proper meter mechanism into the proper outer housing during meter replacement by providing human readable indicia that the technician can check to ensure the proper replacements have occurred.

In various embodiments, memory device 64 may store location identification information representative of the physical location of outer meter housing 42 that the new meter mechanism is being installed into. Memory device 64 may also include payment information representative of parking payments received by the meter. For example payment information may include audit data indicating the amount of currency that has been received by the meter and that should be located in the currency holder within outer meter housing 42. Payment information may also include information regarding credit card transactions received by the meter including batched credit card transaction data that were not able to receive real-time credit card authorization. Memory device 64 may also include meter mechanism configuration data. Configuration data may include rate information (e.g., information indicating the parking rate and parking times that the rate applies), display configuration files (e.g., data that is used by the meter mechanism controller to display the appropriate information on the electronic display screen of the meter) and meter software/firmware (e.g., the appropriate software/firmware versions that allow the meter mechanism to operate within the particular parking system).

In one embodiment, memory device 64 is generally a portable, removable, read-write memory device (e.g., a serial memory device, a memory card, a memory stick, a datakey, etc.). Memory device 64 generally includes one or more electrical contacts configured to contact mating contacts located within meter mechanism 44. In one embodiment, memory device 64 may be a serial flash memory device. In other embodiments, memory device 64 may be other types of removable, read-write memory device including for example, CompactFlash, microSD, miniSD, USB flash, etc.

Figure 5:
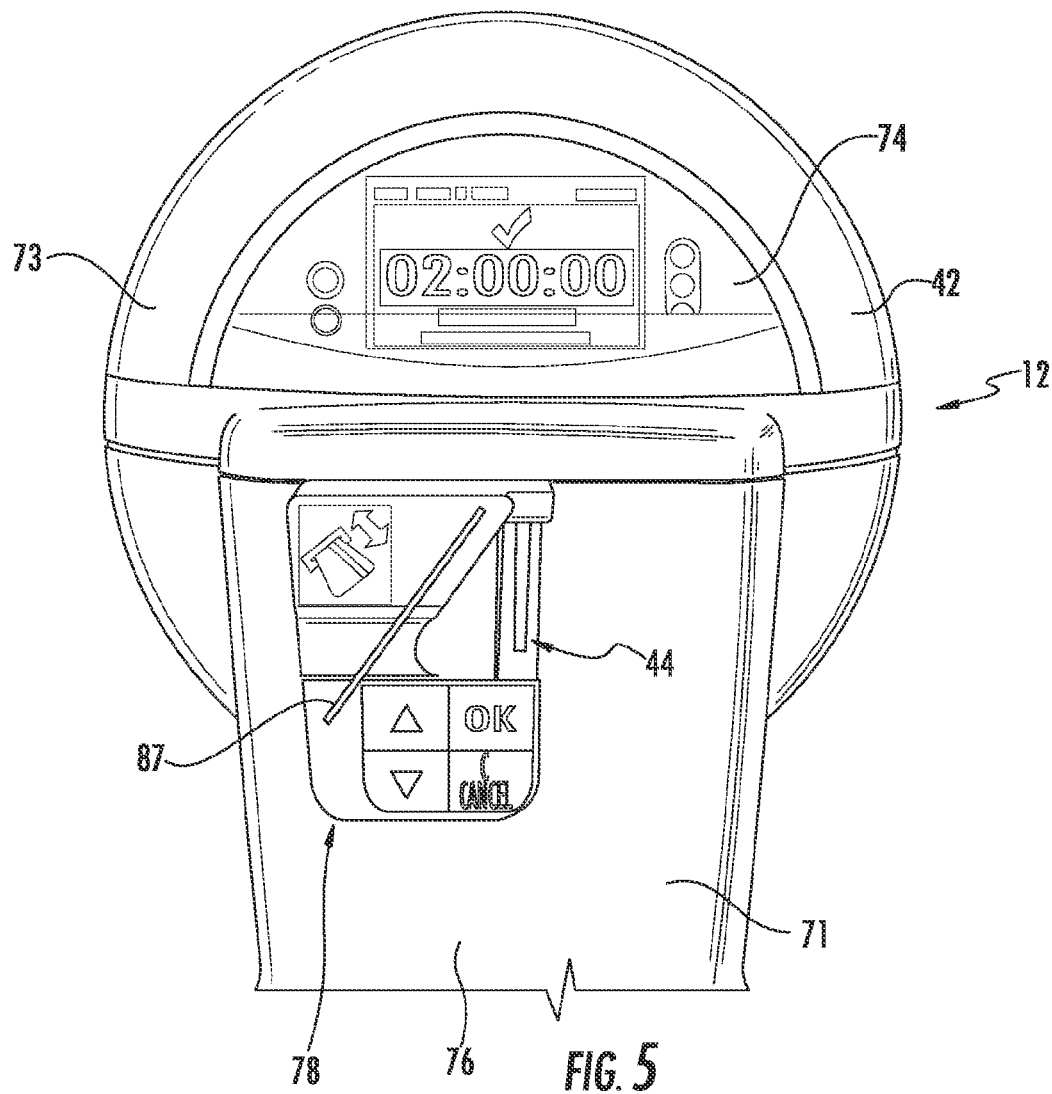
FIG. 5 is a front view of a single-space parking meter according to an exemplary embodiment.

Referring to FIG. 5, single-space meter 12 is shown according to an exemplary embodiment. Single-space meter 12 includes an outer housing 42 and an electronic meter mechanism 44 (shown outside of outer housing 42 in FIG. 6). Outer housing 42 acts to protect electronic meter mechanism 44 and includes a locking mechanism to prevent unwanted access to meter mechanism 44. Outer housing 42 includes a lower housing portion 71 and a cap portion 73. Cap 73 of outer housing 42 includes a transparent portion or window 74 which allows the user to view the display of electronic meter mechanism 44 when it is locked within outer housing 42. Lower portion 71 of outer housing 42 is coupled to an upper end of a support structure or pole 75 that supports meter 12. Lower portion 71 of outer housing 42 has an interior cavity 77 (shown in FIG. 6) and a front (i.e., sidewalk facing) face 76 having a payment device opening, shown as an aperture 78. To assemble meter 12, electronic meter mechanism 44 is received within cavity 77 and cap 73 is coupled to lower portion 71 such that electronic meter mechanism 44 is secured within housing 42.

Figure 7:
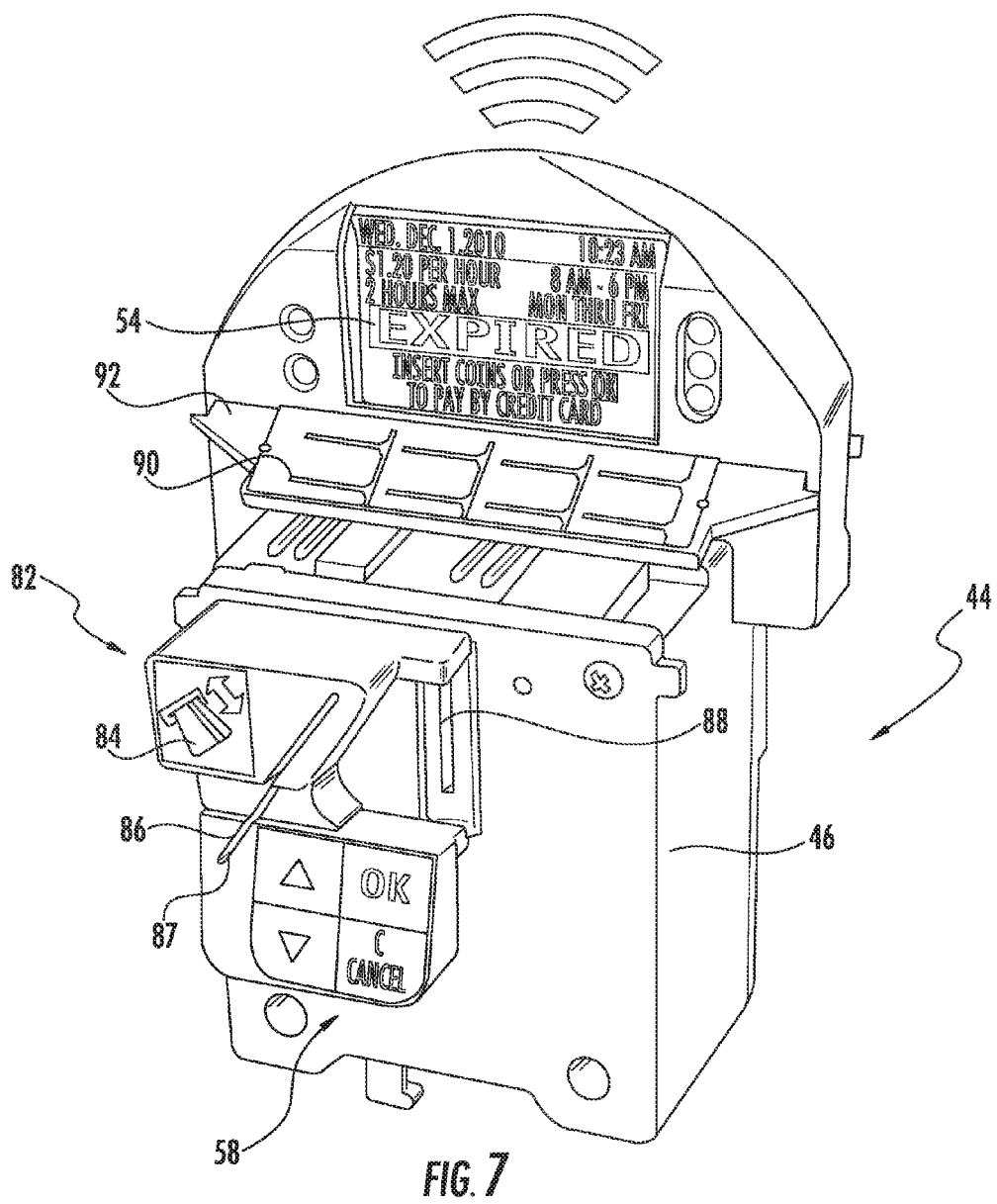
FIG. 7 is a front perspective view of an electronic meter mechanism according to an exemplary embodiment.

Referring to FIG. 7, electronic meter mechanism 44 is shown outside of meter housing 42. Electronic meter mechanism 44 includes an inner housing 46 that supports the various components and electronics of electronic meter mechanism 44. Inner housing 46 is generally the shell or structure that encases and supports the electronics of meter mechanism 44. Inner housing 46 also couples to the inner surface of outer housing 42 such that electronic meter mechanism 44 may be supported by and secured to outer housing 42. As discussed above, electronic meter mechanism 44 includes an electronic display screen, shown as display 54, which displays information to the user. In one embodiment, display 54 includes a first screen viewable from the front of meter mechanism 44 and a second screen viewable from the rear of meter mechanism 44.

Generally, meter mechanism 44 includes a payment receiving structure including one or more payment devices configured to receive payment from a motorist (e.g., a credit card reader, a currency reader, a smart card reader, etc.). In addition, meter mechanism 44 includes a user input device (e.g., a keypad, touch screen, buttons, switches, etc.) that receives inputs from the motorist in order to operate the parking meter. Typically, the payment receiving structure and the user input device is located on the front side of the inner housing such that the motorist is located on the sidewalk when applying payment to the meter or interacting with the user input device.

The exemplary embodiment of electronic meter mechanism 44 shown in FIG. 7 includes an integrated payment and user-interface structure 82 that extends outward from the front side of inner housing 46. Structure 82 includes both at least the physical, payment receiving components of both the payment subsystem 60 and the user input device 58. Structure 82 is an extended portion of the housing that supports both the payment receiving structure and the user input device of meter mechanism 44. In the embodiment shown, user input device 58 is a four button interface including up and down arrow keys, an OK button and a cancel button. In the embodiment shown, payment subsystem 60 includes a hybrid card reader including both a smart card reader 84 and a credit card mag strip reader 86. Payment subsystem 60 also includes a money slot, shown as coin slot 88, and located within structure 82 is a currency reader that detects currency (coins in the example shown) that passes through coin slot 88. In other embodiments, the money slot and currency reader may be configured to accept and detect paper money. Smart card reader 84 may be configured to read a variety of smart-card type payment cards, for example, smart-card credit cards, smart-card debit cards, proprietary parking payment smart cards, etc. Credit card reader 86 may be configured to read a variety of mag-strip based payment cards, including mag-strip credit cards, mag-strip debit cards, proprietary parking mag-strip payment credit cards, etc. In another embodiment, payment subsystem 60 also includes an RF based payment system configured to read an RFID tag associated with the vehicle (e.g., iPass), and to process a parking payment to a pre-registered account associated with the vehicle's RFID tag.

Referring to FIG. 7, credit card reader 86 includes a slot 87 formed in the front face of structure 82. Slot 87 provides the entrance that allows a credit card to be inserted into and to be read by the mag-strip reader of credit card reader 86. As shown, slot 87 is angled relative to the vertical axis of the front face of structure 82. In the embodiment shown, slot 87 is angled such that the upper end of the slot is located laterally inward from the lower end of the slot. Slot 87 extends downward and laterally outward from its upper end to its lower end. Because the length of slot 87 is determined by the size of the type of credit card to be read, angling slot 87 allows for conservation of space on the front face of structure 82.

Figure 8:
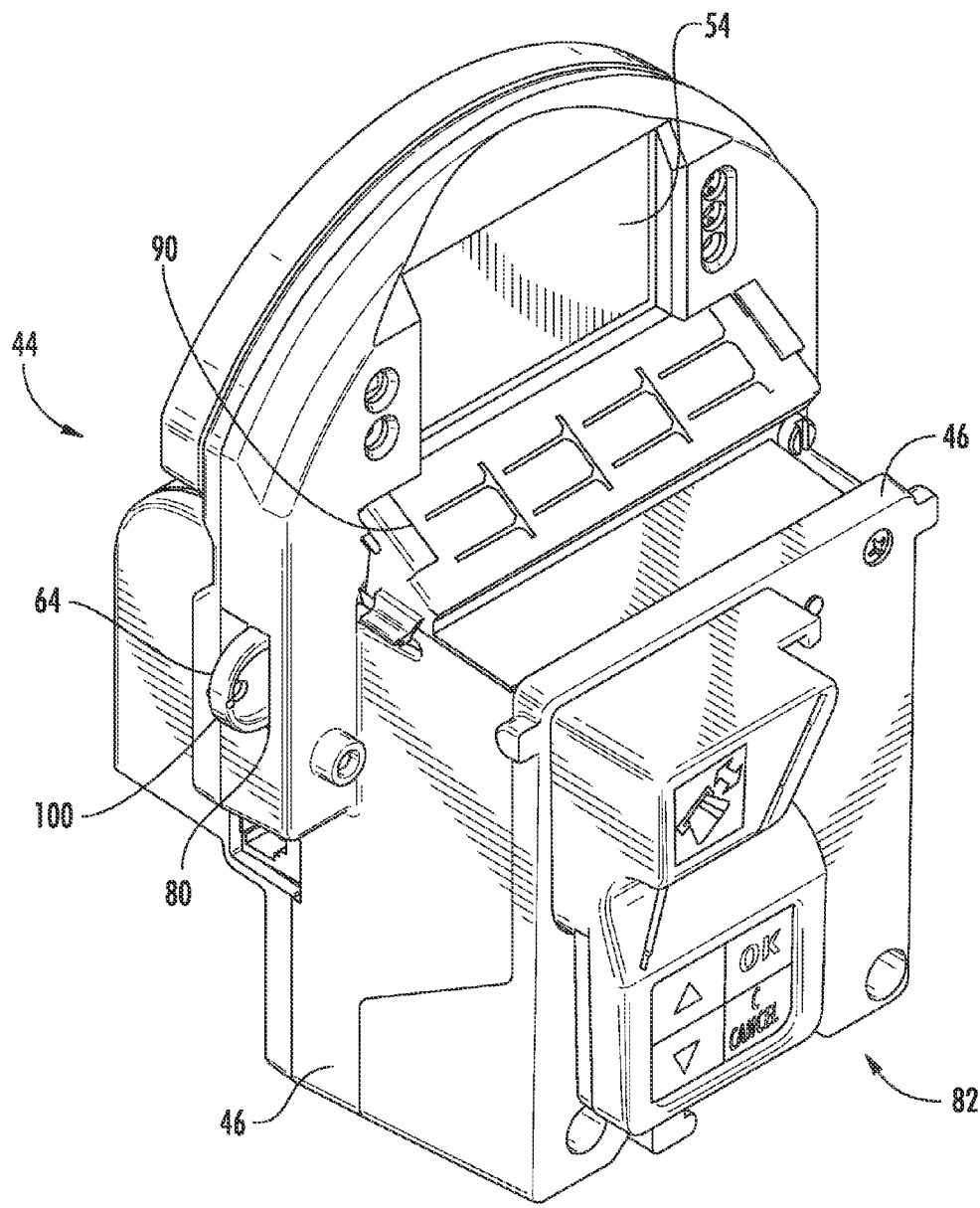
FIG. 8 is front perspective view of an electronic meter mechanism and a removable memory device according to an exemplary embodiment.

As shown in FIGS. 7 and 8, electronic meter mechanism 44 includes a front solar panel 90 that provides power to operate electronic meter 72 and to charge a rechargeable battery located inside inner housing 46. Inner housing 46 includes a front shelf, shown as shelf 92, upon which front solar panel 90 is mounted. Further, shelf 92 extends from the front surface (i.e., the sidewalk facing surface) of inner housing 46 and is positioned below (i.e., at a lower position as measured along the vertical axis of the meter mechanism) display 54 such that shelf 92 is located below window 74 of outer housing 42. Thus, this positioning of solar panel 90 allows meter mechanism to be installed into a pre-existing meter housing in a configuration that allows sun light to reach panel 90 after the meter mechanism is secured within outer housing 42. Electronic meter mechanism may also include a rear solar panel similar to solar panel 90 but located on the rear (i.e., street-facing side of the meter mechanism). In other embodiments, electronic meter mechanism 44 may include one solar panel or more than two solar panels.

Electronic meter mechanism 44 is configured to provide wireless communication from the meter to parking management system 18. In one embodiment, electronic meter mechanism 44 may include cellular communications hardware (e.g., GPRS modem, antenna, etc.) located within and/or coupled to inner housing 46. In another embodiment, electronic meter mechanism 44 includes RF communications hardware (e.g., point-to-multipoint RF modem, antenna, etc.). In another embodiment, electronic meter mechanism 44 includes both cellular communications hardware and RF communications hardware allowing the mechanism to be incorporated into either systems using a gateway or using direct meter cellular communications.

Figure 6:
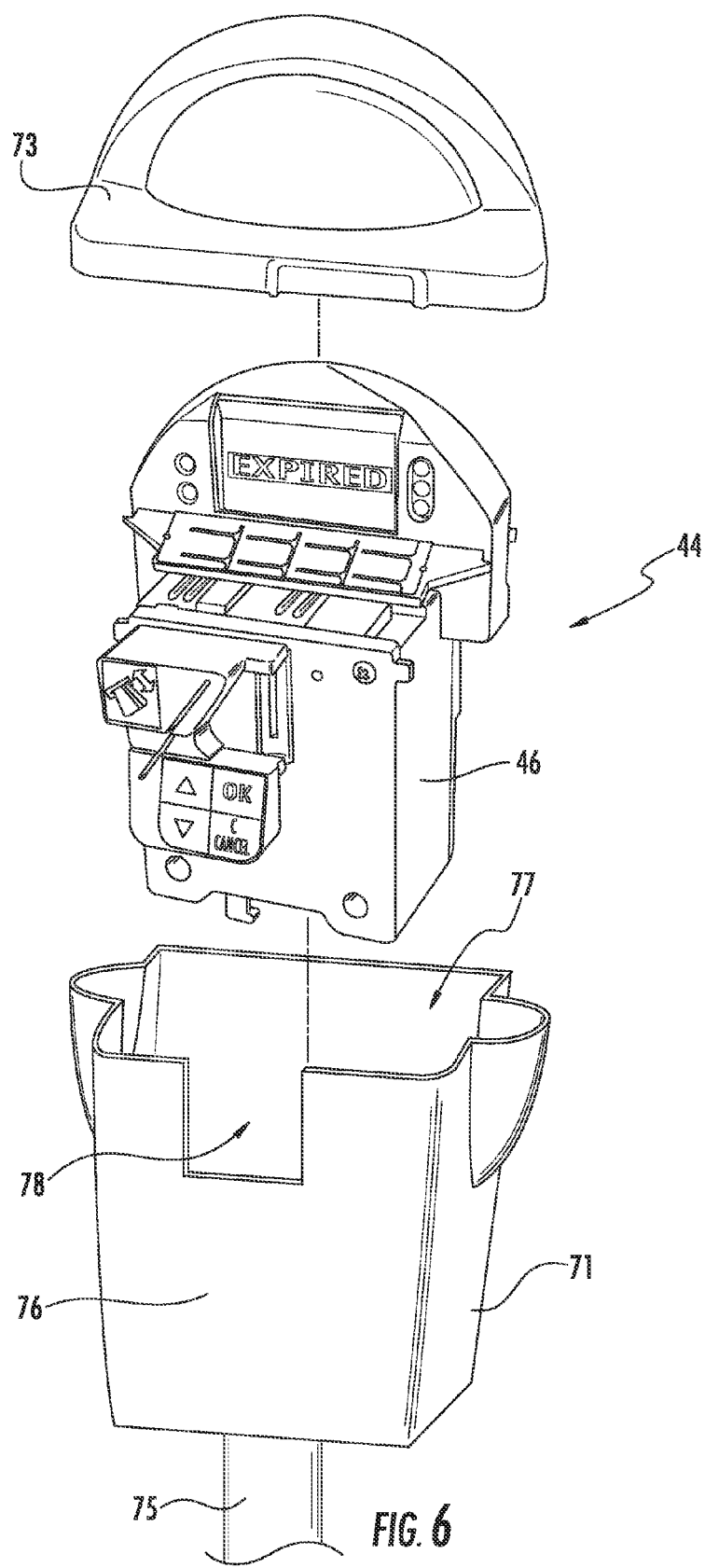
FIG. 6 is an exploded view of a single-space parking meter according to an exemplary embodiment.

Referring to FIG. 6, meter mechanism 44 is received within cavity 77 of lower housing 71. Payment-user interface structure 82 is received within aperture 78 and extends outward from outer housing 42. This arrangement allows the motorist to interact with payment systems and the user interface 82, when most of electronic meter mechanism is secured within outer housings 42. Next, cap 73 is coupled to lower housing 71. FIG. 5 shows meter mechanism 44 secured within housing 42 following attachment of cap 73 to lower housing 71.

FIG. 8 shows meter mechanism 44 according to an exemplary embodiment. FIG. 8 shows removable memory device 64 received within slot 80. Slot 80 is an opening or aperture that extends through inner housing 46 that allows removable memory device 64 to engage electrical contacts of a memory device reader located inside inner housing 46. In the embodiment shown in FIG. 8, slot 80 is formed through a lateral surface of inner housing 46. Lateral positioning of slot 80 makes slot 80 and memory device 64 less conspicuous to the user of meter 12, when the meter mechanism is received within outer housing 42. It should be noted that in the embodiment of FIG. 8, that interface structure 82 includes a vertical key pad that is recessed within the keypad housing in contrast to the keypad shown in the embodiment of FIG. 7 that includes an angled surface.

Figure 9:
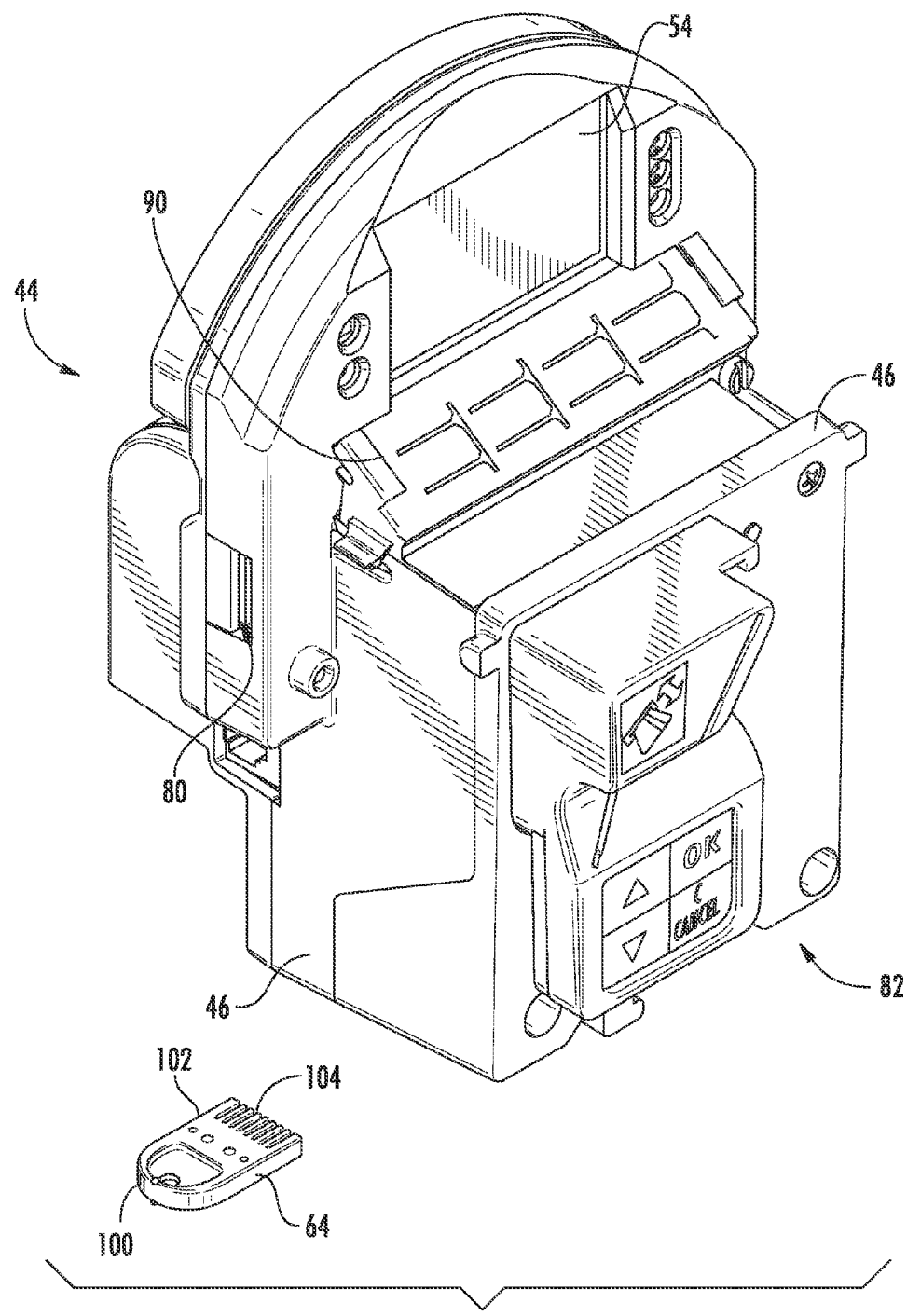
FIG. 9 is a front perspective view of the electronic meter mechanism of FIG. 8 showing the memory device removed according to an exemplary embodiment.

Referring to FIG. 9, memory device 64 includes an outer section 100 and an inner portion 102 including electrical contacts 104. When installed into slot 80, inner portion 102 is received within inner housing 46 and electrical contacts 104 are engaged with opposing contacts of a memory device reader located within slot 80. The electrical contact provided by electrical contacts 104 allows parking meter control system 50 to read and write data to memory device 64. Electrical contacts 104 provide a sliding electrical contact with the corresponding contacts within outer housing 46. Outer section 100 extends outward beyond the outer surface of inner housing 46 and provides a gripping surface that may be gripped to remove or install memory device 64.

Figure 10:
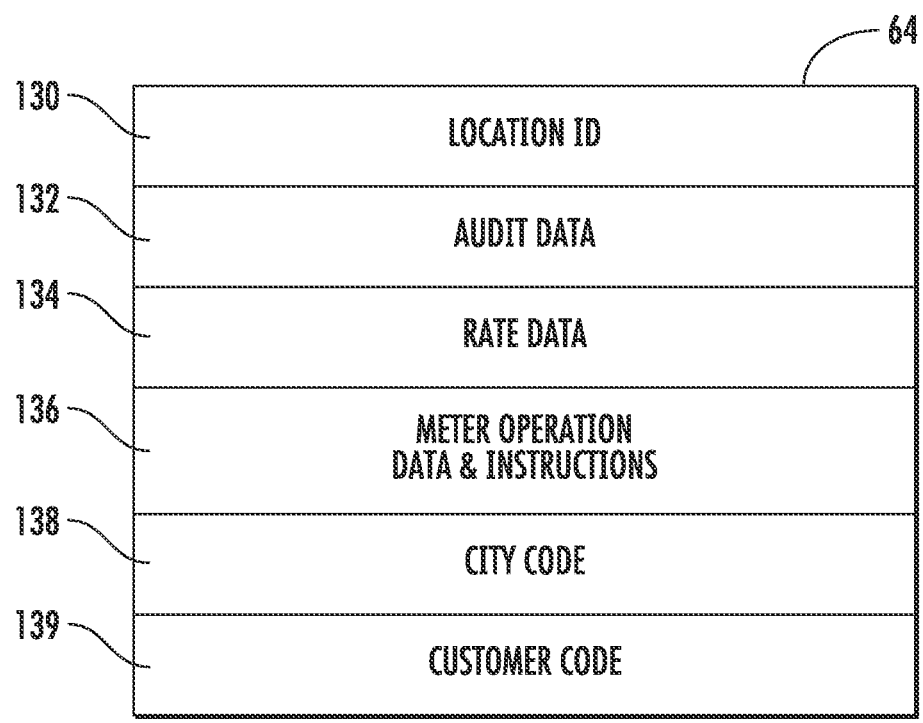
FIG. 10 is a diagram depicting a removable memory device according to an exemplary embodiment.
Figure 11:
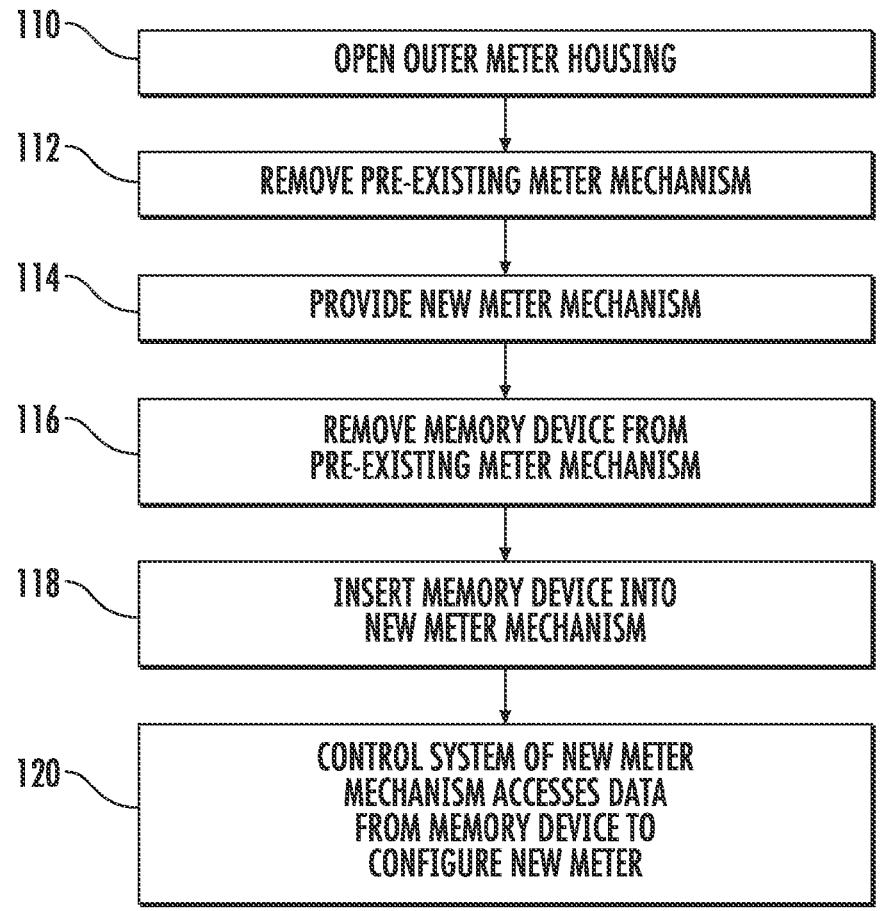
FIG. 11 is a flow diagram showing replacement of a pre-existing meter mechanism with a new, replacement meter mechanism according to an exemplary embodiment.
Figure 12:
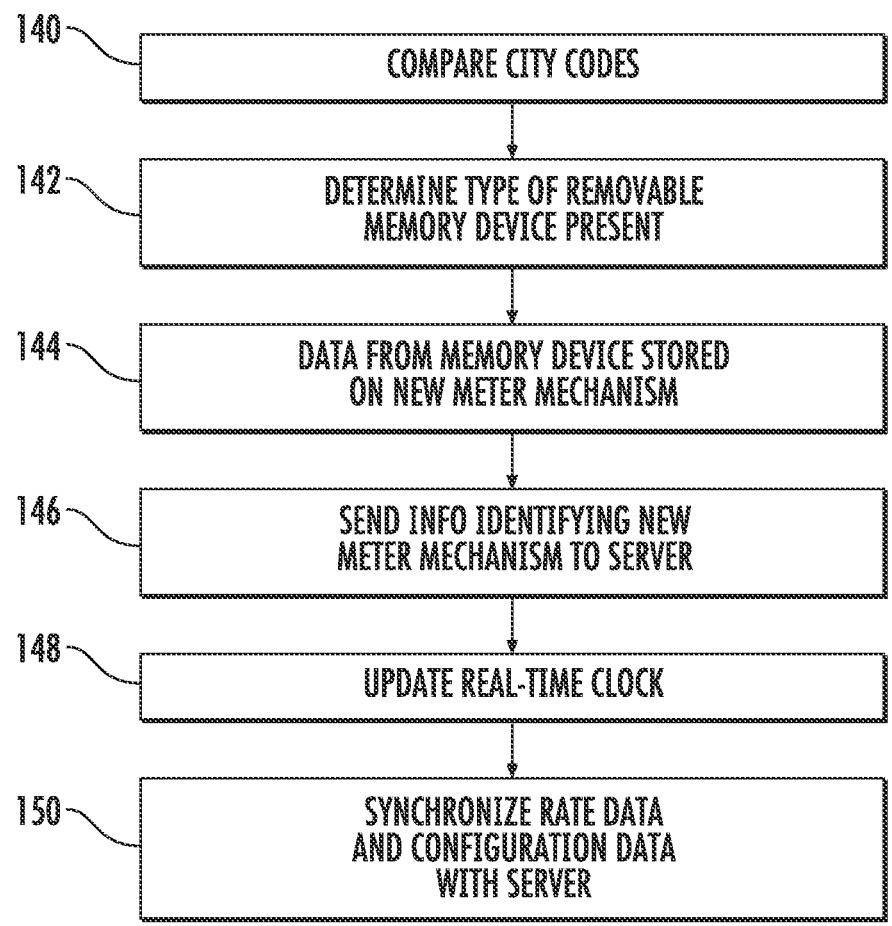
FIG. 12 is a flow diagram showing use of the removable memory device of FIG. 10 by the controller of the new, replacement meter mechanism according to an exemplary embodiment.

Generally, the meter mechanism discussed herein include one or more removable memory device that includes operation mode information that is read by the electronic meter control system to select the operation mode of the meter mechanism. Referring to FIG. 10, a diagram of removable memory device 64 is shown according to an exemplary embodiment, and FIGS. 11 and 12 show a process of utilization of data from memory device 64 by a new meter mechanism 44 to configure new meter mechanism 44 to operate properly within parking system 10. As shown in FIG. 10, memory device 64 may include location identification information, shown as a location ID 130, that uniquely identifies an individual single space meter 12 and/or that identifies an individual outer housing 42 within parking system 10. In one embodiment, location ID 130 is a unique identifier identifying the physical, geographic location within parking system 10 of the single space meter outer housing 42 in which memory device 64 is located. Location ID 130 may be direct location data (e.g., coordinates, address, etc.), and in other embodiments, location ID 130 may be an identifier that may be cross-referenced to identify the location of an individual single space meter 12. Location ID 130 is an example of operation mode information because identification of location ID on memory device 64 indicates that the meter re-assignment process shown in FIGS. 11 and 12 is to occur. Memory device 64 may also include payment information, shown as audit data 132. Audit data 132 is data representative of currency that has been received by the single space meter and that should be located in the currency box of the meter. Audit data 132 from a particular single space meter is a variable data set and depends on the amount of currency that has been applied to the meter since the last time the currency box had been emptied. Payment information stored on memory device 64 may also include batched credit card transaction data.

Memory device 64 includes rate data 134. Rate data 134 is data representative of the cost of parking at single space meter 12. In various embodiments, rate data 134 provides a cost per unit time (e.g., cost per quarter hour, cost per hour, etc.) and may be variable. For example, variable rate data 134 for a particular meter may include data indicating that the parking rate increases during times of peak usage and decreases during times of lower use. Memory device 64 also includes meter configuration information, shown as meter operation data and instructions 136. Meter operation data and instructions 136 include data and/or software that can be accessed by the meter mechanism 44 to ensure meter mechanism 44 operates properly. In various embodiments, meter operation data and instructions 136 includes operation software that is used by meter controller 50 to control the various devices of meter mechanism 44. In one embodiment, data and instructions 136 are instructions utilized by controller 50 to control display 54. In such an embodiment, data and instructions 136 may be specific to a particular city or location in that data and instructions 136 are configured to allow meter to display a customized message (e.g., a city's name, a name of an area or shopping district, etc.).

Removable memory 64 also includes owner data, shown as city code 138 and customer code 139. City code 138 is a unique identifier that identifies the city that the parking meter belongs to. As discussed in more detail below, city code 138 is utilized to ensure that a particular meter mechanism is used and installed in a meter owned by the correct city. Customer code 139 is a unique identifier that identifies the owner/operator of parking system 10 within parking management system 18 (specifically within the database maintained by server 19). Customer code 139 is used to ensure data from single space meter 12 is associated with the correct customer within parking management system 18. Further uses of a unique identifier for a customer allows parking management system 18 to manage multiple parking systems 10 each having their own unique customer ID.

While installed and operating at a single space meter 12, the control system 50 of meter mechanism 44 is configured to update the information stored on removable memory device 64 so that it is up to date. For example, as meter mechanism 44 receives payment, audit data 132 is updated on memory device 64. As meter mechanism receives updates to the rate schedule or to various configuration data and software (e.g., via automatic wireless update from parking management system 18), rate data 134 and meter operation data and instructions 136 are updated.

As noted above, removable memory device 64 is configured to facilitate replacement of a first electronic meter mechanism 44 (e.g., a current meter mechanism, a pre-existing meter mechanism, etc.) with a second electronic meter mechanism 44 (e.g., a replacement meter mechanism, a new meter mechanism, etc.). FIG. 11 depicts a process for replacing a pre-existing electronic meter mechanism 44 with a new electronic meter mechanism 44 according to an exemplary embodiment. At step 110, outer meter housing 42 is opened. Outer meter housing 42 is the housing of a particular single space meter 12 located at a physical, geographic location with parking system 10. At step 112, the pre-existing electronic meter mechanism 44 is removed from outer meter housing 42. The pre-existing electronic meter mechanism 44 is a meter mechanism that has been operating at a particular single space meter 12 previously that may need to be replaced for a variety of reasons including failure of one or more of the mechanism components, need for routine maintenance, replacement with upgraded meter mechanism version, etc.

At step 114, a new electronic meter mechanism 44 is provided. In one embodiment, at step 114, providing the new electronic meter mechanism 44 includes delivering the new electronic meter mechanism to a recipient. In this embodiment, it may be the recipient (e.g., an employee, a co-worker, a third-party purchaser, a customer, a customer's employee, etc.), that performs or operates the meter mechanism to perform the other steps shown in FIGS. 11 and 12. At step 116, removable memory device 64 is removed from the pre-existing electronic meter mechanism 44, and at step 118, the removable memory device 64 from the pre-existing electronic meter mechanism 44 is inserted into slot 80 of the new electronic meter mechanism 44. At step 120, control system 50 of the new meter mechanism accesses data on removable memory device 64, and control system 50 utilizes the data from removable memory device 64 to ensure that new meter mechanism 44 is configured to operate properly for the geographic location of parking meter 12 and to operate properly within parking system 10. In one embodiment, electronic meter mechanism 44 includes a reset button that when pressed instructs the meter mechanism to access the data on removable memory device 64. Because memory device 64 includes the same rate data, configuration data and payment data as the pre-existing meter mechanism 44, transferring this information from memory device 64 directly to the new meter mechanism ensures that the new meter mechanism 44 operates the same as the pre-existing meter mechanism 44.

FIG. 12 shows a process of utilization of data from the memory device 64 of the pre-existing meter mechanism 44 by the new meter mechanism 44 to configure new meter mechanism 44 to operate properly within parking system 10. At step 140, when instructed to access data from removable memory device 64 (e.g., by pressing of the meter reset button as discussed above), meter control system 50 first checks to make sure memory device 64 and the new meter mechanism 44 are assigned to the same city. In one embodiment, confirmation at step 140 occurs by comparing a city code stored on the permanent memory on the new meter mechanism 44 with city code 138 on memory device 64. If the city codes match, it indicates that both the memory device 64 and the new meter mechanism 44 are assigned to the same city, and the process proceeds. If the city codes do not match, an error code is displayed on screen 54 indicating that city codes do not match.

At step 142, meter control system 50 determines the type of removable memory device present. In one embodiment, control system 50 may determine that memory device 64 is from the pre-existing meter by identifying location ID 130. In this embodiment, identification of location ID 130 provides the indication to meter control system 50 that meter mechanism replacement is occurring and indicates that meter control system 50 should perform the meter mechanism replacement process shown in FIG. 12. If a location ID 130 is not present, meter control system 50 utilizes the memory device in one of the modes or processes discussed below or will generate an error message.

As shown in FIG. 12, information from memory device 64 is directly transferred to the new meter mechanism 44. Specifically, at step 144, location ID 130, audit data 132, rate data 134 and meter operation data and instructions 136 are stored on the new meter mechanism 44. With this transfer of information, new meter mechanism 44 includes all of the data and software to ensure new meter mechanism 44 operates properly in place of the previous meter mechanism 44. For example, audit data 132 is carried over to the new meter so that as additional payments are received by the parking meter the audit data 132 includes an accurate total despite the replacement of the meter mechanism. Rate data 134 is used to ensure the new meter mechanism 44 adds the appropriate amount of time to the meter upon receipt of payment. Meter operation data and instructions 136 are used by the new meter mechanism 44 to ensure proper operation of the devices controlled by meter control system 50.

At step 146, unique meter mechanism ID information, for example the serial number that identifies the new meter mechanism 44 is communicated to server 19 of parking management system 18. The database maintained by server 19 is then updated such that the new meter mechanism serial number is associated with location ID 130 on the server. In this way, parking management system 18 is able to track the physical, geographic location of each unique meter mechanism 44 within parking system 10. In one embodiment, the unique customer ID 139 from memory device 64 is compared with the customer ID associated with the location ID and meter serial number on server 19 to ensure that the new meter mechanism is linked to the database for the appropriate customer. In one embodiment, control system 50 controls communication subsystem 52 to wirelessly communicate the new serial number to parking management system 18 via wireless network 16. Because meter mechanism 44 is able to communicate directly with parking management system 18, meter mechanism 44 is able to perform the serial number update without further technician involvement. In one embodiment, a unique meter ID number is generated based on the meter serial number and the meter ID number is used to properly correlate data within the database of server 19.

Generally, as new meter mechanism 44 configures itself to operate properly for a particular single space meter 12, meter mechanism 44 utilizes its wireless communication functions to synchronize various data and software with parking management system 18. At step 148, control system 50 controls communication subsystem 52 to wirelessly receive updated real-time clock data from parking management system 18. Control system 50 then uses the real-time clock data to update local time keeping process as needed. This helps ensure proper time-keeping by new meter mechanism 44.

At step 150, a check is performed to ensure that the rate data 134 and meter operation data and instructions 136 received from removable memory device 64 are up to date. For example, the database maintained by server 19 includes rate data and configuration data associated with each unique location ID. If the rate data 134 and/or meter operation data and instructions 136 stored on the new meter mechanism 44 do not match the corresponding data maintained by server 19 for the unique location ID, it is determined that an update is needed. If an update is needed, new versions of rate data 134 and/or operation data and instructions 136 are downloaded wirelessly from parking management system 18 utilizing communications subsystem 52 of the new meter mechanism 44. Because meter mechanism 44 is equipped with wireless communications hardware that allows it to communicate directly with server 19, meter mechanism 44 can automatically synchronize files that were out of date on the prior meter mechanism 44.

It should be understood that removable memory device 64 provides a mechanism by which the current data maintained by a pre-existing meter mechanism 44 may be directly transferred to a replacement meter mechanism 44. In other embodiments, other direct transfers of the data shown on memory device 64 may be used. For example, in one embodiment during the replacement process, a cable may be connected from the pre-existing meter mechanism 44 to the new meter mechanism 44, and the needed data is transferred directly from the non-volatile memory of the pre-existing meter mechanism 44 to the non-volatile memory of the new meter mechanism 44. In another embodiment, this transfer may occur via direct short range, wireless communication link (e.g., a blue tooth link). In these embodiments, the needed data is transferred directly from one meter to a new meter without the need for an intermediate device (e.g., a laptop, a handheld computer, etc.) receiving the data first. Further, direct transmission of data from the old meter to the new meter, particularly data generated locally by the meter (e.g., payment data, vehicle sensor data, etc.), allows for integrity of data in the event of communications failure between the pre-existing meter and parking management system 18.

Figure 13:
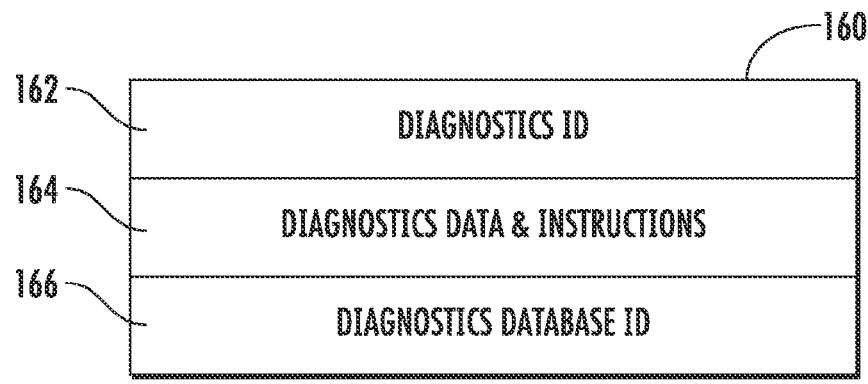
FIG. 13 is a diagram depicting a removable memory device configured for diagnostics and maintenance according to an exemplary embodiment.

In various embodiments, the ability to read a removable memory device, such as removable memory device 64, may be utilized during processes other than the meter mechanism replacement process discussed above. For example as shown in FIG. 13, a removable memory device 160 can be configured to place a meter mechanism 44 into a diagnostics/maintenance mode. Memory device 160 includes a diagnostics ID 162 instead of location ID 130. Diagnostics ID 162 is an example of operation mode information because identification of diagnostics ID 162 on memory device 160 indicates that the meter diagnostic process shown in FIG. 14 should occur. Diagnostics ID 162 is read by meter mechanism 44 and triggers start of the diagnostics/maintenance mode. Memory device 160 also includes diagnostics data and instructions 164 that are utilized by meter mechanism 44 to operate in the diagnostics/maintenance mode. Memory device 160 includes a diagnostic database ID 166 instead of owner ID information (e.g., city code 138 or the customer ID 139 discussed above). Diagnostic database ID 166 puts meter mechanism 44 in communication with a diagnostics database located on server 19 to ensure data generated by the meter mechanism during diagnostics does not get communicated to a "live" customer database located on server 19.

Figure 14:
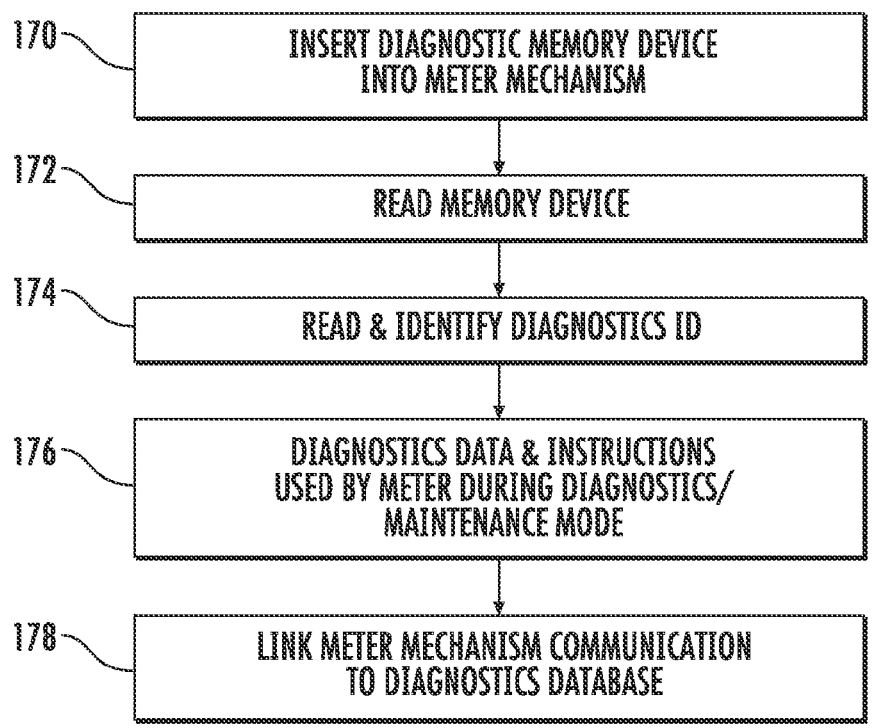
FIG. 14 is a flow diagram showing use of the removable memory device of FIG. 13 by the controller of an electronic meter mechanism according to an exemplary embodiment.

Referring to FIG. 14, a method of performing diagnostics and maintenance for a meter mechanism 44 is shown according to an exemplary embodiment. At step 170, a diagnostics/maintenance memory device 160 is inserted into memory slot 80 of the meter mechanism. At step 172, the meter mechanism is instructed to read memory device 160, for example by pressing the reset button. At step 174, meter mechanism 44 reads diagnostic ID 162 of memory device 160 and determines that the diagnostic/maintenance mode should be entered.

At step 176, the diagnostics data and instructions 164 are utilized by meter mechanism 44 to ensure proper operation of the mechanism during the diagnostics and maintenance process. For example, diagnostics data and instructions 164 include instructions to provide for proper display of diagnostics information and menus on display 54 of the meter mechanism. Diagnostics data and instructions 164 may also include test data (e.g., test audit data, test rate data, test time data, test error codes, etc.) that may be utilized during the maintenance process to confirm proper operation of the meter mechanism 44. At step 178, meter mechanism 44 is linked to a diagnostics database associated with parking management system 18. In one embodiment, the diagnostics database ID 166 is read by meter mechanism 44, and meter mechanism 44 controls wireless communications subsystem 52 to transmit diagnostics database ID 166 to parking management system 18 via wireless network 16. Use of diagnostics database ID 166 links meter mechanism 44 to a diagnostics database that is part of parking management system 18. This link ensures that data transmitted wirelessly from meter mechanism 44 during diagnostics and maintenance is not stored in a live customer database.

In another embodiment, memory device 160 may include a diagnostic data flag in place of, or in addition to, diagnostics database ID 166. In this embodiment, during diagnostic mode, meter mechanism 44 may be configured to transmit data generated during diagnostics directly to a live customer database, and in this embodiment, the diagnostic data is stored in the live database associated with the diagnostic data flag. The diagnostic data flag provides an indicator that can be used to identify and segregate the diagnostic data from real data in the live parking database. In this embodiment, server 19 may be configured to handle parking data associated with the diagnostics data flag in various ways. For example, in one embodiment, following diagnostics, server 19 may be configured to search and delete all data associated with a diagnostic data flag. Further the diagnostics data flag may be used by server 19 to store and/or display diagnostics data in a separate diagnostics data table, and server 19 may be configured to perform various server-side diagnostics procedures using the flagged diagnostics data.

Figure 15:
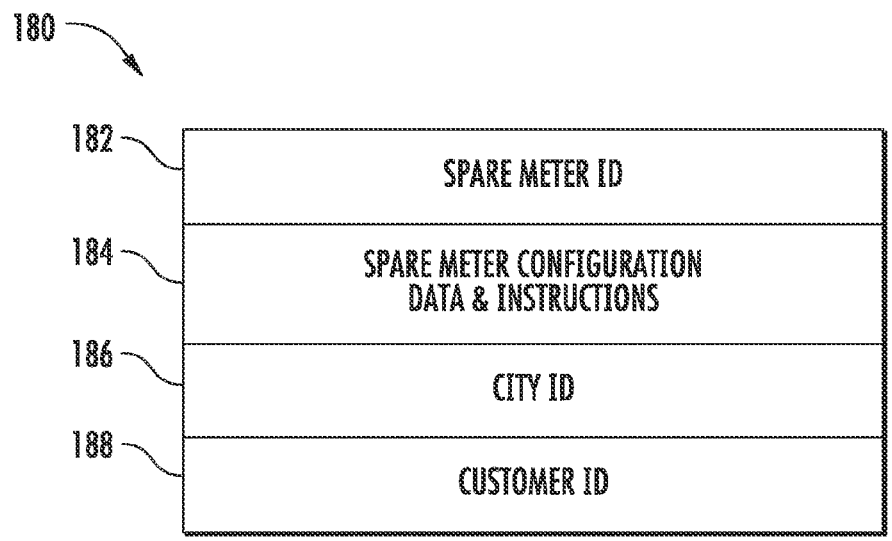
FIG. 15 is a diagram depicting a removable memory device configured for assigning an electronic meter mechanism to a low power storage mode according to an exemplary embodiment.

Referring to FIG. 15, a removable memory device 180 configured to place a meter mechanism 44 into a low power standby mode and to assign the meter to "spare" status is shown. Memory device 180 includes a standby or "spare" meter ID 182, spare meter operation instructions 184, city ID 186 and customer ID 188. Generally, spare meter ID 182 takes the place of location ID and is utilized by the meter mechanism 44 to identify that the meter mechanism 44 is being assigned as a spare. Spare meter ID 182 is an example of operation mode information because identification of spare meter ID 182 on memory device 180 indicates that the process of placing the meter mechanism is the low power standby mode, shown in FIG. 16, should occur. Spare meter operation instructions 184 are utilized by meter mechanism 44 to ensure meter mechanism 44 operates properly in the low power standby mode while the mechanism is assigned as a spare. City ID 186 and customer ID 188 are utilized to properly update the database for the proper city and customer to identify that the particular meter mechanism is assigned as a spare instead of being assigned to a particular single space meter 12 in parking system 10.

Figure 16:
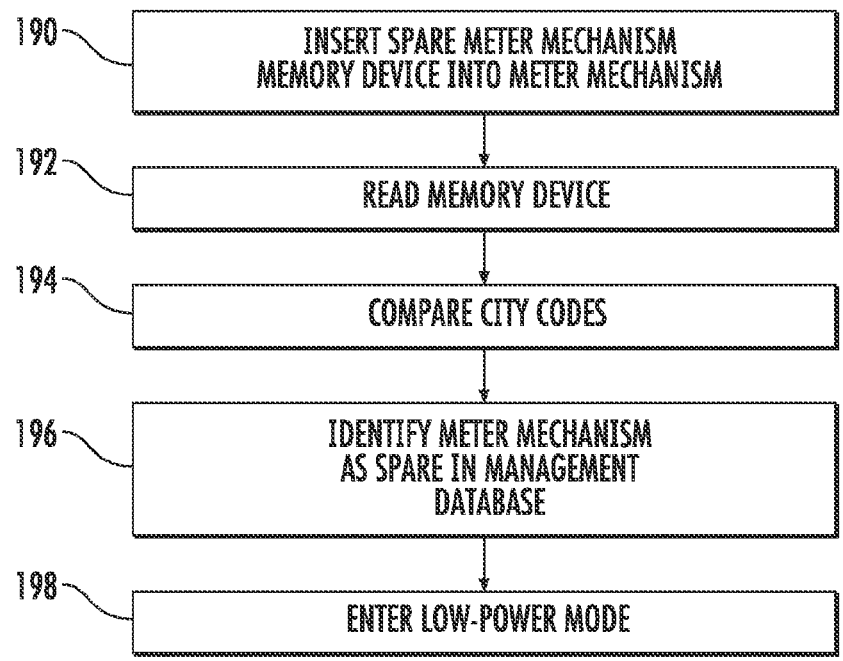
FIG. 16 is a flow diagram showing use of the removable memory device of FIG. 15 by the controller of an electronic meter mechanism according to an exemplary embodiment.

Referring to FIG. 16, a process for configuring a meter mechanism 44 as a spare is shown according to an exemplary embodiment. At step 190, memory device 180 is inserted into slot 80 of a meter mechanism 44. At step 192, meter mechanism 44 is instructed to access memory device 180 for example by the pressing of the reset button. At step 194, meter control system 50 first checks to make sure memory device 180 and the new meter mechanism 44 are assigned to the same city. In one embodiment, this confirmation occurs by comparing a city code stored on the permanent memory on the new meter mechanism 44 with city code 186 on memory device 180. If the city codes match, it indicates that both the memory device 180 and the new meter mechanism 44 are assigned to the same city, and the process proceeds. If the city codes do not match, an error code is displayed on screen 54 indicating that city codes do not match.

At step 196, the database maintained by server 19 is updated to show that the particular meter mechanism 44 used by the city is assigned as a "spare" and is no longer associated with a particular location ID. At step 196, customer ID 188 may be checked to ensure that the appropriate city's database is being updated. In one specific embodiment, the database entry for a particular meter (e.g., indexed using the meter serial number or other unique meter identifier) is updated to set the location ID for that particular meter to a value indicating spare status (e.g., a null value). In another embodiment, a spare location ID may be set showing the physical location of a spare meter within a city's storage facilities. In another embodiment, the database record for a particular meter may have a field identifying whether a meter is a spare or not. Communication to update the meter mechanism's status as a spare occurs utilizing the wireless communication subsystem 52 of meter mechanism 44.

Following updating of the database at step 196, at step 198, control system 50 of meter mechanism 44 utilizes spare meter configuration data and instructions 184 to enter the low power standby operation mode. In one embodiment, during standby mode, display screen 54 displays an appropriate message, for example "standby" or "spare." In another embodiment, display screen 54 is turned off to conserve power. In addition, various components of meter mechanism 44 may be powered down or inactivated to conserve power during standby mode. In one such embodiment, meter mechanism 44 is configured to cease wireless communication via communication subsystem 52 when in standby mode. In addition, periodic polling of currency or payment sensors in the payment receiving devices of meter mechanism 44 is ceased. In this mode, the spare meter mechanism may be stored until needed while using minimal power from the meter's battery. A meter that has been assigned "spare" status may be reassigned to active status by the insertion of a memory device, such as memory device 64, associated with a particular physical meter location within parking system 10. The process shown in FIG. 11 and FIG. 12 may then be executed to move meter mechanism 44 from "spare" status to active status.

Figure 17:
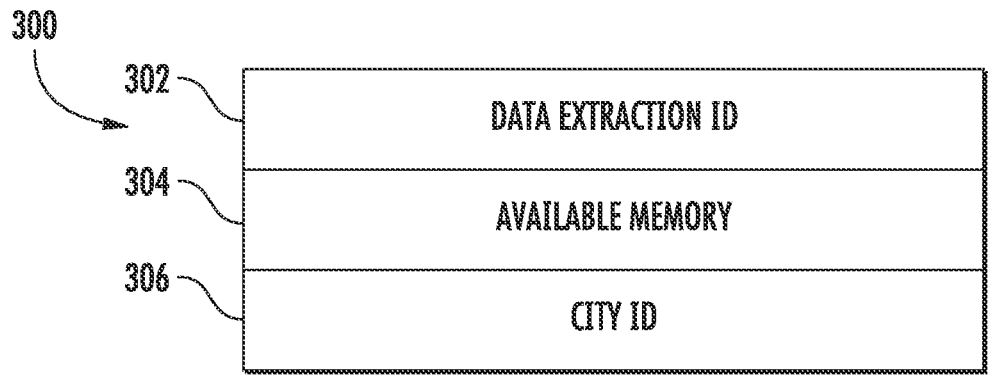
FIG. 17 is a diagram depicting a removable memory device configured for data extraction according to an exemplary embodiment.

Referring to FIG. 17, a removable memory device 300 configured to facilitate extraction of various data from a meter mechanism 44 is shown according to an exemplary embodiment. Memory device 300 includes a data extraction ID 302 and a storage location, shown as available memory 304. Memory device 300 also includes a city ID 306. Data extraction ID 302 is an example of operation mode information because identification of data extraction ID 302 on memory device 300 indicates that the data extraction process shown in FIG. 18 should occur.

Meter mechanism 44 is configured to store various information during operation of the meter mechanism at one of the single space meters 12 within parking system 10 as discussed above. For example, meter mechanism 44 includes a non-volatile memory that stores audit data (e.g., audit data 132 shown above) regarding the amount of currency that has been received by the meter. Meter mechanism 44 also stores batched credit card transaction data (e.g., data regarding credit card transactions that are stored for processing at a later time, typically because real-time credit card authorization was not available at the time of credit card payment). Meter mechanism 44 may also include storage of various logs, information from the vehicle sensor associated with the single space meter, error codes, data regarding power usage, etc. Removable memory device 300 is configured for extraction of such data prior to operations in which such data may be erased or the integrity of the data may be compromised.

Figure 18:
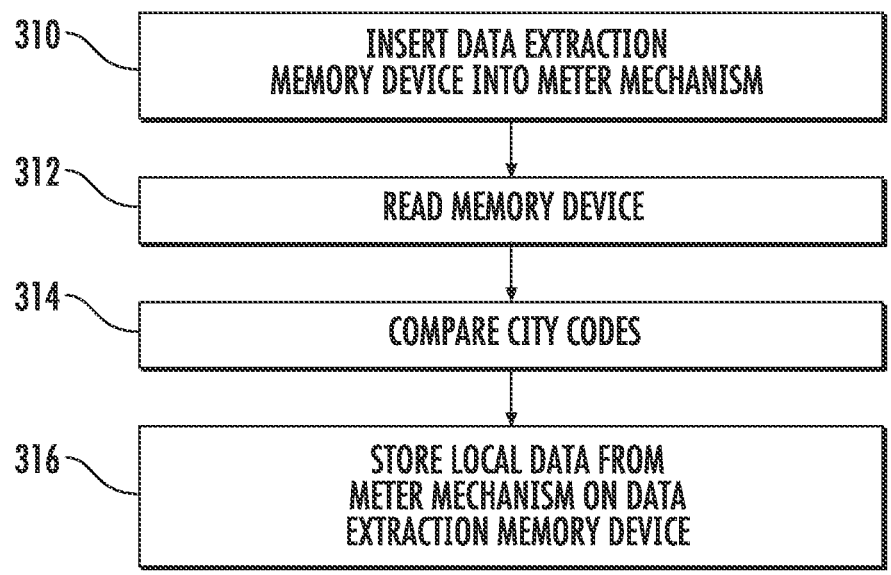
FIG. 18 is a flow diagram showing use of the removable memory device of FIG. 17 by the controller of an electronic meter mechanism according to an exemplary embodiment.

Referring to FIG. 18, a data extraction process using memory device 300 is shown according to an exemplary embodiment. At step 310, memory device 300 is inserted into slot 80 of a meter mechanism 44. At step 312, meter mechanism 44 is instructed to access memory device 300, for example, by the pressing of the reset button. At step 314, meter control system 50 first checks to make sure memory device 300 and the new meter mechanism 44 are assigned to the same city. In one embodiment, this confirmation occurs by comparing a city code stored on the permanent memory on the new meter mechanism 44 with city code 306 on memory device 300. If the city codes match, it indicates that both the memory device 300 and the new meter mechanism 44 are assigned to the same city, and the process proceeds. If the city codes do not match, an error code is displayed on screen 54 indicating that city codes do not match.

At step 316, local data from meter mechanism 44 is stored to available memory 304 of memory device 300. The user or technician can then use the data as needed. For example, logged data can be stored within the database of server 19 for the particular meter, and batched credit card transactions can be processed. If no local data is present on meter mechanism 44, in one embodiment a message is displayed on screen 54 indicating that there is no data to extract. In various embodiments, the data extraction process shown in FIG. 18 may be performed prior to any process in which loss of locally stored data may occur. For example, the data extraction process shown in FIG. 18 may be performed prior to reassignment using memory device 64, prior to diagnostics and maintenance using memory device 160 and prior to assignment as a spare using memory device 180.

In one embodiment, a parking meter kit is provided. In this embodiment, the kit includes one or more electronic meter mechanisms 44, one or more removable memory devices 64 configured to facilitate replacement of one meter mechanism of a single space meter with a new electronic meter mechanism, one or more diagnostics memory devices 160, one or more spare memory devices 180 and/or one or more data extraction memory devices 300.

Referring to FIG. 19, a block diagram of electronic meter mechanism 44 is shown according to an exemplary embodiment. In this embodiment, electronic meter mechanism 44 includes two distinct processors, shown as peripheral device and communication controller 200 and single-space meter (SSM) controller 202, and the local processing and control functions of electronic meter mechanism 44 are divided between the two processors. Generally, SSM controller 202 conducts the processing for and controls the display 204, a user input device, such as keypad 216 or input device 58 shown in FIG. 7, and the time-keeping functions of the meter (e.g., determining current time remaining on the meter, decreasing time remaining as time passes, increasing time remaining as payment is made, determining expiration of the meter when time expires, etc.), and communication controller 200 conducts processing for and controls wireless communication subsystem 210, vehicle sensor 214 and memory device reader 250. In addition, control of the additional components of electronic meter mechanism 44 may be split between the two processors 200 and 202 as shown below in FIG. 19.

In one embodiment, both controllers 200 and 202 are controllers specifically configured for control of certain components of an electronic meter mechanism. In another embodiment, controller 200 is a multi-purpose or multi-use control/communication device that is communicably coupled a dedicated single-space meter controller 202 in order to supplement the functionality provided by SSM controller 202 and to equip electronic meter mechanism 44 with additional peripheral devices that are not controlled by SSM controller 202. For example, in one embodiment, SSM controller 202 is a dedicated single-space meter controller and is coupled to, interfaces and/or controls a user display 204, a money sensor 206, a smart card reader 208 and keypad 216. In one specific embodiment, SSM controller 202 is the controller present in a conventional electronic single-space parking meter and controller 200 is communicably coupled to SSM controller 202 along with additional components shown in FIG. 19 (e.g., elements 210, 212, 214, 218 and 250) as a retrofit unit to provide additional functionality to the meter. The division of control between two processors may provide electronic meter mechanism 44 with a higher efficiency and lower power requirement, than if one single processor were used. For example, both controllers 200 and 202 have a low power state and a high power state, and the controllers are configured to be in a low power state when the devices it controls are not active and in the high power state when the devices under its control are active. For example, controller 202 may transition from the low power to the high power state when data is to be received or transmitted using the wireless communications hardware.

SSM controller 202 controls display of information on display 204 and also receives and processes input signals received from keypad 216. SSM controller 202 is configured to receive information from keypad 216. SSM controller 202 may use this data to alter the display of information on display 204 based on the user inputs and to operate the payment receipt functions of the meter. As shown in FIG. 5, keypad 216 may be a four button keypad that allows the user to operate the parking meter. In this embodiment, SSM controller 202 may communicate information received from keypad 216 to controller 200, and controller 200 may in turn communicate the information to parking management system 18 via wireless communication subsystem 210.

SSM controller 202 receives an input signal from money sensor 206 indicating when a user has placed money into the parking meter. Money sensor 206 may include an inductive coil sensor configured to detect that presence and denomination of coin placed in the coin slot of the meter. In another embodiment, money sensor 206 may be an optical sensor associated with a coin slot configured to detect the presence and the denomination of coins placed in the coin slot of the meter. In one embodiment, money sensor 206 may incorporate an inductive coin sensor to detect money entering the coin slot and an optical sensor to detect a jam or foreign object located within the coin slot. Money sensor 206 may also include an optical sensor associated with a paper money slot configured to detect the presence and the denomination of paper money placed into the paper money slot of the meter. SSM controller 202 also receives input from smart card reader 208 indicating that the user has paid for parking using a smart card.

Peripheral device and communication controller 200 may be communicably coupled to a variety of additional parking meter devices to supplement the functionality provided by SSM controller 202. In the embodiment shown in FIG. 19, controller 200 is coupled to, interfaces and/or controls a wireless communication subsystem 210, a power supply system 212, a vehicle sensor 214, a credit card reader 218 and a removable memory device reader 250. Thus, with controller 200 coupled to SSM controller 202, electronic meter mechanism 44 is provided with the functionalities provided by wireless communication subsystem 210, power supply system 212, vehicle sensor 214, user interface keypad 216, credit card reader 218 and memory device reader 250.

Controller 200 controls wireless communication subsystem 210 to provide electronic meter mechanism 44 with wireless communication functionality. As discussed in detail above, wireless communication subsystem 210 provides the communication hardware and software that allows meter mechanism 44 to send information to and to receive information from parking management system 18. Signals indicating that payment has been received from money sensor 206 or smart card reader 208 may be communicated from SSM controller 202 to controller 200, and controller 200 may in turn communicate this information to parking management system 18 utilizing wireless communication subsystem 210. Further, controller 200 may communicate information received from power supply 212, vehicle sensor 214 and credit card reader 218 to parking management system 18 using wireless communication subsystem 210. In one specific embodiment, controller 200 may communicate data to the SSM controller 202 that indicates the receipt of a credit card payment has been received, and SSM controller 202 is configured to add time to the meter and to display additional time based upon the data related to the receipt of credit card payment.

As discussed above, wireless communication subsystem 210 may include hardware and software to communicate directly with parking management system 18 via cellular telephone communication standards. In other embodiments, wireless communication subsystem 210 may utilize an RF based communication standard to communicate with a gateway which in turn communicates with parking management system 18.

Controller 200 interfaces with power supply 212 to provide power to the components of electronic meter mechanism 44. As shown in FIG. 19, power supply 212 includes a rechargeable battery 220 and one or more solar cells or solar panels 222 (e.g., front solar panel 90 and/or rear solar panel 91). Battery 220 may be one or multiple batteries and may power both controller 200 and SSM controller 202 and the components coupled to each controller. Solar panel 222 is coupled to battery 220 and acts to recharge battery 220. Solar panel 222 is physically located on the housing of meter mechanism 44 such that it may receive sunlight transmitted through the window located on the front and or rear surfaces of the outer housing of the meter. Controller 200 may receive data related to various operating states of power supply 212 and may communicate this data to parking management system 18 via wireless communication subsystem 210. For example, controller 200 may receive data regarding the charge state of battery 220, recharge rate of battery 220, the recharge effectiveness or efficiency of solar cell 222, etc. This data may be processed by parking management system 18 to determine whether a battery and/or solar cell in a particular single-space meter needs to be replaced.

Controller 200 also interfaces vehicle sensor 214. Vehicle sensor 214 may be pole-mount vehicle sensors 20, curb surface-mount sensor 22 or street surface-mount sensor 24 discussed above, or any other sensing device suitable for vehicle detection of the past, present or future. Vehicle sensor 214 generates a signal indicative of the vehicle located in the parking spot associated with electronic meter mechanism 44 and communicates the signal to controller 200. Controller 200 may communicate information related to the vehicle in the parking space to SSM controller 202, and SSM controller 202 may use this information to operate the devices under its control. For example, display 204 may be updated by SSM controller 202 based on the information from vehicle sensor 214 to prompt the user of the parking meter to select the method of payment to be used for the parking session. Controller 200 may also transmit data from vehicle sensor 214 to parking management system 18 using wireless communication subsystem 210. In one embodiment, processor 200 is configured to process the signal indicative of the presence of the vehicle within the parking space received from vehicle sensor 214 to determine whether a vehicle is parked in the parking space when the meter is expired. In this embodiment, processor 200 is configured to control wireless communication subsystem 210 to transmit data indicative of a vehicle parked at an expired meter to parking management system 18.

Controller 200 also interfaces with a credit card reader 218 configured to generate a signal indicative of credit card data of the credit card received by the reader. Credit card reader 218 includes a card detector 224 and a mag-strip reader 226. Card detector 224 detects the presence of a credit card being inserted into the slot of the credit card reader and information indicative of the presence of a credit card is communicated to controller 200. Controller 200 may communicate this information to SSM controller 202, and SSM controller 202 may update display 204 to indicate that payment by credit card is being used.

Controller 200 and/or SSM controller 202 may be configured to execute a function that allows the user to pay for parking using the credit card. Mag-strip reader 226 reads the credit card information from the user's credit card. The credit card information is communicated from mag-strip reader 226 to controller 200, and controller 200 communicates this information to a credit card authorization system using wireless communication subsystem 210 for authorization and processing. The credit card authorization system processes the credit card information, and approval information from the credit card authorization system is received by wireless communication subsystem 210 and is communicated to controller 200. If the payment by credit card is approved, controller 200 communicates credit card approval to SSM controller 202, and SSM controller 202 updates display 204 and adds time to the meter as appropriate. If payment by credit card is not approved, controller 200 communicates lack of credit card approval to SSM controller 202, and SSM controller 202 updates display 204 with the appropriate message and time is not added to the meter.

Controller 200 is also communicably coupled to memory device reader 250. When one of the memory devices (e.g., memory device 64, memory device 160, memory device 180 or memory device 300) discussed herein is received within slot 80, the electrical contacts of the memory device engage corresponding electrical contacts 252 of the memory device reader. The contacts may provide for slidable and non-permanent electrical interface between the removable memory device and the memory device reader. With one of the memory devices engaged with memory device reader 250, controller 200 is able to communicate with the removable memory device to provide the various functionalities discussed herein.

As shown in FIG. 19, communication between the various components of electronic meter mechanism 44 is provided by communication links 246. Communication links 246 may be dedicated wires or wireless communication connections. Communication links 246 may also represent communication over a network. Communication links 246 may be communication links provided on a printed circuit board, an integrated circuit or may be cable connections. One or more communication links 246 may utilize various standard cable connections (e.g., Ethernet, USB, RJ-11, etc.), and one or more communication links 246 may utilize custom or proprietary cable connections. In one embodiment, communication links 246 may be hardwired connections or couplings that allow for communication of data and also for the transmission of power from the power supply to the various device of the meter mechanism. In various embodiments, communication links 246 may be any combination of the types of links discussed herein.

In one embodiment, a new electronic meter mechanism 44 may be constructed utilizing a first controller 200 to control a first group of peripherals (e.g., devices 210, 212, 214, 218 and 250) and a second controller 202 to control a second group of peripherals (e.g., devices 204, 206, 208 and 216). In other embodiments, an existing electronic meter mechanism 44 having an SSM meter controller 202 that controls a pre-existing group of peripherals (e.g., devices 204-208 and 216) is upgraded by the addition of controller 200 and a new group of peripherals (e.g., devices 210, 212, 214, 218 and 250). In this embodiment, controller 200 may be physically present on a separate board or chip than controller 202, and controller 200 may be coupled to communicate with controller 202 to provide electronic meter mechanism 44 with the functions provided by the new group of peripherals. In another embodiment, the functionality of controller 200 and SSM controller 202 may be provided by a single controller (e.g., a single processing circuit including hardware and software to control devices 204-208 and 210-218 and 250).

In one embodiment, display 204 may be an upgraded display (e.g., a color display, high resolution display, graphical display, etc.) that is part of a retrofit unit. In one such embodiment, controller 200 (instead of SSM controller 202) may control the display of information via display 204 in order to provide updated software, processing power, etc. needed to control upgraded display 204. In this embodiment, the display control functionality of SSM controller 202 may be disabled and SSM controller 202 may only control devices 206, 208 and 216.

Figure 20:
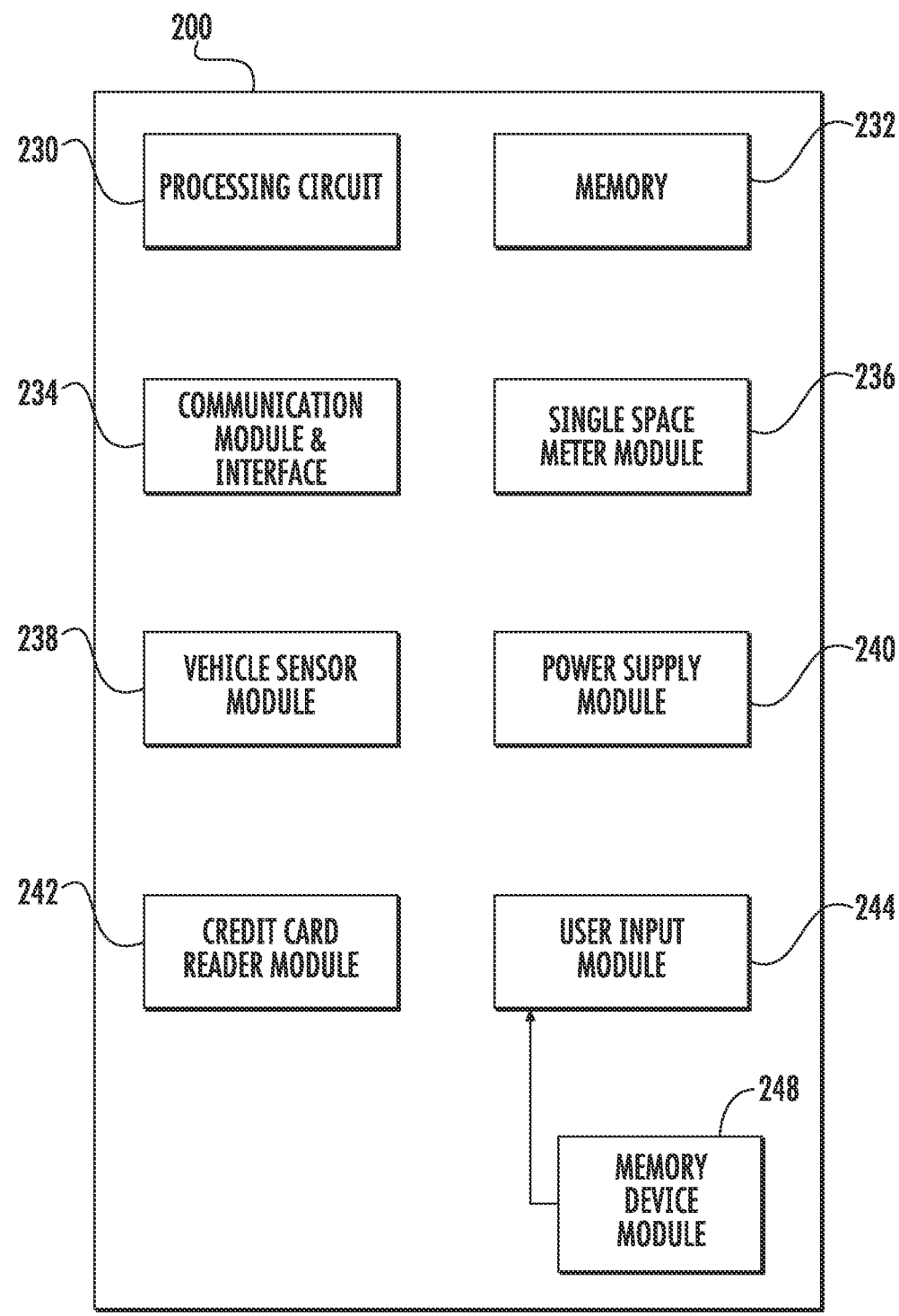
FIG. 20 is a block diagram of a controller for a parking meter according to an exemplary embodiment.

Referring to FIG. 20, a detailed block diagram of peripheral device and communication controller 200 is shown according to an exemplary embodiment. Controller 200 may generally be an electronic control unit suitable to provide electronic meter mechanism 44 with the various functionalities described herein. For example, controller 200 may be an embedded system, a dedicated circuit, a general purpose system or circuit programmed with the functionality described herein, etc. Controller 200 includes a processing circuit 230, memory 232, a communication module and interface 234, a single-space meter module 236, a vehicle sensor module 238, a power supply module 240, a credit card reader module 242 and memory device module 248. In one embodiment, controller 200 may include a user input module 244, which may be disabled in applications in which the user input device is controlled by SSM controller 202.

Processing circuit 230 may be a general purpose processor, an application specific processor (ASIC), a circuit containing one or more processing components, a group of distributed processing components, a group of distributed computers configured for processing, etc., configured to provide the functionality of module components of controller 200. Memory 232 (e.g., memory unit, memory device, storage device, etc.) may be one or more devices for storing data and/or computer code for completing and/or facilitating the various processes described in the present disclosure. Memory 232 may include volatile memory and/or non-volatile memory. Memory 232 may include database components, object code components, script components, and/or any other type of information structure for supporting the various activities described in the present disclosure.

According to an exemplary embodiment, any distributed and/or local memory device of the past, present, or future may be utilized with the systems and methods of this disclosure. According to an exemplary embodiment, memory 232 is communicably connected to processing circuit 230 and module components 234-244 and 248 (e.g., via a circuit or any other wired, wireless, or network connection) and includes computer code for executing one or more processes described herein. A single memory unit may include a variety of individual memory devices, chips, disks, and/or other storage structures or systems.

Module components 234-244 and 248 may be computer code (e.g., object code, program code, compiled code, script code, executable code, instructions, programmed instructions, non-transitory programmed instructions, or any combination thereof), hardware, software, or any combination thereof, for conducting each module's respective functions. Module components 234-244 and 248 may be stored in memory 232, or in one or more local, distributed, and/or remote memory units configured to be in communication with processing circuit 230 or another suitable processing system.

Communication module and interface 234 includes one or more components for communicably coupling controller 200 to the other components of parking system 10. For example, in the embodiment shown in FIG. 19, communication module and interface 234 includes one or more components for communicably coupling controller 200 to the other components of electronic meter mechanism 44 via communication links 246. As discussed in more detail below, communication module and interface 234 includes one or more components for communicably coupling controller 200 to various components of parking system 10 in various different configurations.

Communication module and interface 234 may include one or more jacks or other hardware for physically coupling communication links 246 to controller 200, analog to digital converters, digital to analog converters, signal processing circuitry, and/or other suitable components. Communication module and interface 234 may include hardware configured to connect controller 200 with the other components of electronic meter mechanism 44 via wireless connections. Communication module and interface 234 is configured to support the communication activities of controller 200 (e.g., negotiating connections, communication via standard or proprietary protocols, etc.). Communication module and interface 234 is also configured to support operation of wireless communication subsystem 210 to provide connectivity and communication between controller 200 and parking management system 18 via a wired or wireless network.

Single-space meter module 236 is configured to allow controller 200 to interface and communicate data with one or more SSM controllers 202. Vehicle sensor module 238 is configured to allow controller 200 to interface with, communicate data with and/or control one or more vehicle sensors 214. Power supply module 240 is configured to allow controller 200 to interface with, communicate data with and/or control power supply 212. Power supply module 240 may also be configured to regulate and distribute power from power supply 212 to power various components of controller 200, or other components of parking system 10 as needed in a particular arrangement. Credit card reader module 242 is configured to allow controller 200 to interface with, communicate data with and/or control credit card reader 218. Credit card reader module 242 is also configured to allow controller 200 to interface with a credit card authorization system to process credit card payments. User input module 244 is configured to allow controller 200 to interface with, communicate data with and/or control keypad 216. Memory device module 248 is configured to allow controller 200 to interface and to read and write data to a removable memory device received within memory device reader 250.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. While the current application recites particular combinations of features in the various embodiments discussed herein, various embodiments of the invention relate to any combination of any of the features described herein, and any such combination of features may be claimed in this or future applications. Any of the features, elements, or components of any of the exemplary embodiments discussed above may be claimed alone or in combination with any of the features, elements, or components of any of the other embodiments discussed above.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A single space parking meter kit comprising:
   a first single space meter mechanism comprising:
      an inner housing;
      an electronic display screen supported by the inner housing of the first single space meter mechanism;
      a wireless communication subsystem supported by the inner housing of the first single space meter mechanism configured to wirelessly communicate with a parking management system;
      an electronic meter control system controlling the electronic display screen and the wireless communications subsystem of the first single space meter mechanism; and
      a removable read-write memory device accessible from outside of the inner housing of the first single space meter mechanism, the removable memory device including location identification information that uniquely identifies the physical, geographic location of the first single space meter mechanism within a parking system and payment information representative of parking payments received by the first meter mechanism; and
   a second single space meter mechanism comprising:
      an inner housing;
      an electronic display screen supported by the inner housing of the second single space meter mechanism;
      a wireless communication subsystem supported by the inner housing of the second single space meter mechanism configured to wirelessly communicate with the parking management system;
      an electronic meter control system controlling the electronic display screen and the wireless communications subsystem of the second single space meter mechanism;
      a meter identification number; and
      a port configured to receive the removable read-write memory device;
      wherein the control system of the second single space meter mechanism is configured to access the location identification information and the payment information from the removable read-write memory device following receipt of the read-write memory device by the port and to communicate both the location identification information and the identification number of the second single space meter to the parking management system such that the identification number of the second single space meter is associated with the location identification information and the payment information;
      wherein the payment information from the first single space meter mechanism is directly transferred to the second meter mechanism.

2. The single space parking meter kit of claim 1 wherein the removable read-write memory device further includes:
   meter configuration information;
   wherein the electronic meter control system of the second single space meter mechanism is configured to store payment information in non-volatile memory associated with the second single space meter mechanism and to use the meter configuration information to control operation of the electronic display screen of the second single space meter mechanism.

3. The single space parking meter kit of claim 2 wherein the first single space meter mechanism includes a currency reader and a credit-card reader, and further wherein payment information includes at least one of audit data representative of currency received by the currency reader and batched credit card transaction data representative of credit card payment information received by the credit-card reader.

4. The single space parking meter kit of claim 2 wherein meter configuration information further includes parking rate data.

5. The single space parking meter kit of claim 1 wherein the port is a slot formed through the inner housing of the second single space meter mechanism.

6. The single space parking meter kit of claim 1 wherein the removable read-write memory device is a serial flash memory device.

7. A computerized parking management system for processing, storing and communicating data within a wirelessly communicating parking system, the parking system including a plurality of single-space parking meters each equipped with an electronic meter mechanism, the parking management system comprising:
   a control computer;
   a parking system database controlled by the control computer, the database including a unique meter ID representative of each electronic meter mechanism within the parking system and a unique location ID representative of the physical, geographic location of each single-space parking meter within the parking system; and
   wireless communications hardware controlled by the control computer configured to transmit data wirelessly to the plurality of single space parking meters within the parking system;
   wherein, following replacement of a pre-existing electronic meter mechanism with a new electronic meter mechanism at one of the single space parking meters, the control computer is configured to receive a new meter ID communicated wirelessly from the new meter mechanism that identifies the new electronic meter mechanism;
   wherein the control computer is configured to associate the new meter ID with the location ID for the single space meter that has received the new electronic meter mechanism within the parking system database.

8. The computerized parking management system of claim 7 wherein, following receipt of the new meter ID, the control computer is configured to transmit up to date configuration data to the new meter mechanism via the wireless communications hardware.

9. The computerized parking management system of claim 8 wherein configuration data includes at least one of rate data and meter mechanism control software.

10. A method of replacing a pre-existing electronic meter mechanism with a new electronic meter mechanism comprising:
    opening an outer meter housing that surrounds the pre-existing electronic meter mechanism;
    directly transferring location ID information representative of the physical, geographic location of the outer meter housing from the pre-existing electronic meter mechanism to a memory device physically associated with the new electronic meter mechanism;
    directly transferring payment information representative of parking payments received by the preexisting meter mechanism to the new meter mechanism; and
    transmitting the location ID information wirelessly from the new meter mechanism to a parking management system.

11. The method of claim 10 further comprising transmitting a unique meter ID associated with the new meter mechanism wirelessly from the new meter mechanism to the parking management system.

12. The method of claim 10 wherein directly transferring location ID information comprises:
removing a removable read-write memory device from the pre-existing electronic meter mechanism; and
inserting the removable read-write memory device into a port of the new meter mechanism.

13. The method of claim 10 further comprising directly transferring meter configuration data from the pre-existing electronic meter mechanism to the memory device physically associated with the new electronic meter mechanism.

14. The method of claim 13 wherein the configuration data includes parking rate data.

15. A method of replacing a pre-existing electronic meter mechanism with a new electronic meter mechanism comprising:
delivering a new meter mechanism to a recipient, the new meter mechanism comprising:
an inner housing;
an electronic display screen supported by the inner housing;
a wireless communication subsystem supported by the inner housing configured to wirelessly communicate with a parking management system;
an electronic meter control system controlling the electronic display and the wireless communications subsystem;
a port configured to receive data directly from the pre-existing meter mechanism;
wherein the new meter mechanism is configured such that the recipient of the new meter mechanism is permitted to directly transfer location ID information representative of the physical, geographic location of an outer meter housing from the pre-existing electronic meter mechanism to the new electronic meter mechanism;
wherein the new meter mechanism is configured to transmit the location ID information wirelessly directly from the new meter mechanism to the parking management system.

16. The method of claim 15 wherein meter configuration data is directly transferred from the pre-existing electronic meter mechanism to the new electronic meter mechanism.

17. The method of claim 16 wherein the location ID information and the configuration data are directly transferred by removing a removable read-write memory device from the pre-existing electronic meter mechanism and inserting the removable read-write memory device into the port of the new meter mechanism.

18. The method of claim 17 wherein the configuration data includes at least one of parking rate data and data related to the operation of the electronic display screen.

19. The method of claim 17 wherein the new meter mechanism includes a currency reader and a credit-card reader, at least one of audit data representative of currency received by the currency reader and batched credit card transaction data representative of credit card payment information received by the credit-card reader is transferred via the removable read-write memory device.

* * * * *